(12) United States Patent
Matsumoto et al.

(10) Patent No.: US 12,554,119 B2
(45) Date of Patent: Feb. 17, 2026

(54) MULTI-RING MASK, LIGHT IRRADIATION DEVICE, OPTICAL MICROSCOPE, AND PHOTOACOUSTIC MICROSCOPE

(71) Applicant: HAMAMATSU PHOTONICS K.K., Hamamatsu (JP)

(72) Inventors: Naoya Matsumoto, Hamamatsu (JP); Koyo Watanabe, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 577 days.

(21) Appl. No.: 17/921,205

(22) PCT Filed: Jan. 20, 2021

(86) PCT No.: PCT/JP2021/001880
§ 371 (c)(1),
(2) Date: Oct. 25, 2022

(87) PCT Pub. No.: WO2021/220562
PCT Pub. Date: Nov. 4, 2021

(65) Prior Publication Data
US 2023/0168487 A1 Jun. 1, 2023

(30) Foreign Application Priority Data
May 1, 2020 (JP) ................. 2020-081323

(51) Int. Cl.
*G02B 26/02* (2006.01)
*G02B 3/06* (2006.01)
(Continued)

(52) U.S. Cl.
CPC ............... *G02B 26/02* (2013.01); *G02B 3/06* (2013.01); *G02B 21/06* (2013.01); *G02F 1/01* (2013.01); *G02B 2207/113* (2013.01)

(58) Field of Classification Search
CPC ........... G02B 26/02; G02B 3/06; G02B 21/06
See application file for complete search history.

(56) References Cited

U.S. PATENT DOCUMENTS 6,621,571 B1 * 9/2003 Maeda ............. G01N 21/95607
356/237.4
2013/0083322 A1 4/2013 Iketaki et al.
(Continued)

FOREIGN PATENT DOCUMENTS

CN 101430428 A 5/2009
CN 101826340 A 9/2010
(Continued)

OTHER PUBLICATIONS

Machine translation of jp2000-010013A (Year: 2000).*
(Continued)

*Primary Examiner* — Lucy P Chien
(74) *Attorney, Agent, or Firm* — Faegre Drinker Biddle & Reath LLP

(57) ABSTRACT

A light irradiation apparatus focuses light on a surface or an inside of an object to observe or process the object, and includes a laser light source, a lens, a lens, a mask, a wave plate, and a lens. The mask is a multi-ring mask for spatially intensity-modulating input light in a beam cross-section and outputting modulated light, and includes a plurality of ring-shaped light-shielding areas provided around a center position, and a transmitting area provided between two adjacent light-shielding areas out of the plurality of light-shielding areas. A radial width of each of the two adjacent light-shielding areas out of the plurality of light-shielding areas is larger than a radial width of the transmitting area provided between the two light-shielding areas.

12 Claims, 39 Drawing Sheets

(51) Int. Cl.
  *G02B 21/06* (2006.01)
  *G02F 1/01* (2006.01)

(56) References Cited

U.S. PATENT DOCUMENTS

| | | | |
|---|---|---|---|
| 2014/0378811 A1* | 12/2014 | Nanaumi | A61B 5/0075 |
| | | | 600/407 |
| 2016/0018654 A1* | 1/2016 | Haddick | G06F 3/0304 |
| | | | 345/8 |
| 2016/0266368 A1 | 9/2016 | Watanabe et al. | |
| 2019/0250386 A1 | 8/2019 | Dake | |
| 2020/0088985 A1 | 3/2020 | Hirata | |

FOREIGN PATENT DOCUMENTS

| | | |
|---|---|---|
| CN | 101849199 A | 9/2010 |
| CN | 102354068 A | 2/2012 |
| CN | 102589695 A | 7/2012 |
| CN | 103091859 A | 5/2013 |
| CN | 110967784 A | 4/2020 |
| CN | 118176451 A | 6/2024 |
| JP | H11-160102 A | 6/1999 |
| JP | 2000-010013 A | 1/2000 |
| JP | 2010-205381 A | 9/2010 |
| JP | 5144212 B2 | 2/2013 |
| JP | 2013-076770 A | 4/2013 |
| JP | 2013-130852 A | 7/2013 |
| JP | 2015-082013 A | 4/2015 |
| RU | 2441291 C1 | 1/2012 |
| WO | WO-2018/084271 A1 | 5/2018 |
| WO | WO-2018/220670 A1 | 12/2018 |
| WO | WO-2019/123958 A1 | 6/2019 |

OTHER PUBLICATIONS

Machine translation (Year: 2000).*
International Preliminary Report on Patentability mailed Nov. 10, 2022 for PCT/JP2021/001880.
Oketani, Ryosuke et al., "Saturated two-photon excitation fluorescence microscopy with core-ring illumination," Optics Letters, vol. 42, No. 3, 2017, pp. 571-574.

* cited by examiner

Fig.8
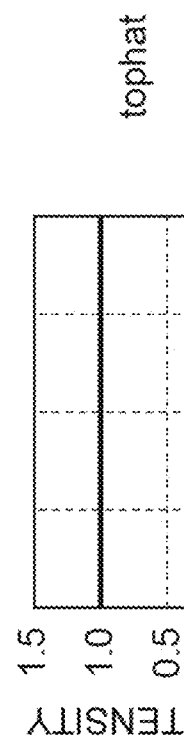
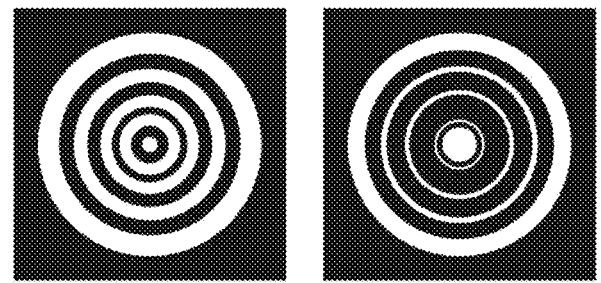
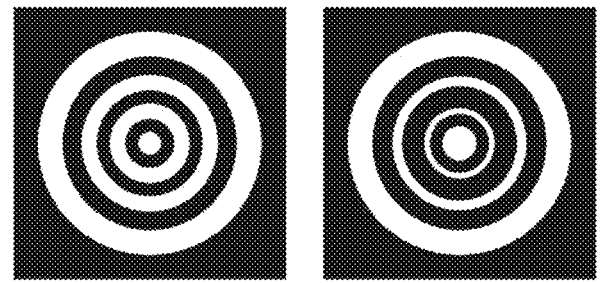
CONVENTIONAL
ART 2
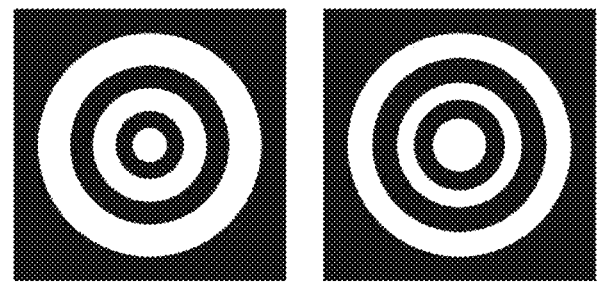
PRESENT
EMBODIMENT Fig.10
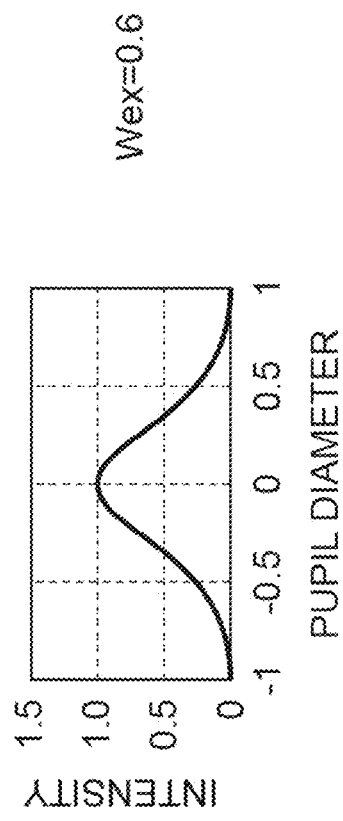
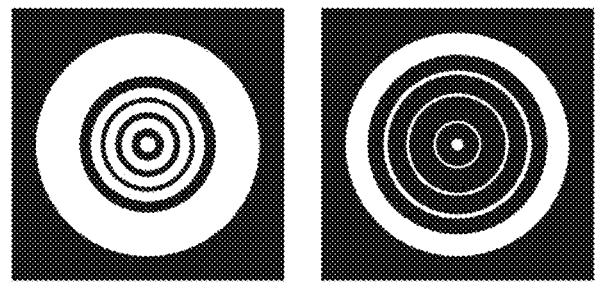
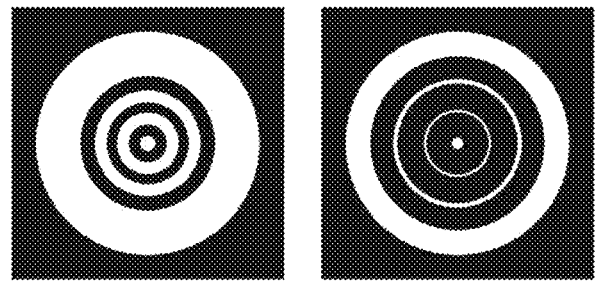
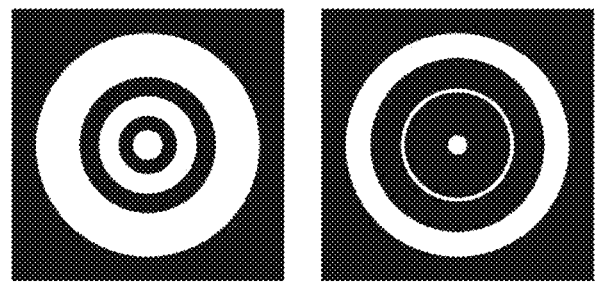

Fig. 11

| | LIGHT-SHIELDING AREA | TRANSMITTING AREA | LIGHT-SHIELDING AREA | TRANSMITTING AREA | LIGHT-SHIELDING AREA | TRANSMITTING AREA | LIGHT-SHIELDING AREA |
|---|---|---|---|---|---|---|---|
| CONVENTIONAL ART 2 | 0.22 | 0.19 | 0.17 | | | | |
| DOUBLE-RING | 0.172 | 0.145 | 0.133 | 0.127 | 0.118 | | |
| TRIPLE-RING | 0.14 | 0.115 | 0.107 | 0.1 | 0.095 | 0.093 | 0.092 |
| QUADRUPLE-RING | | | | | | | |

Fig. 12

| PRESENT EMBODIMENT | LIGHT-SHIELDING AREA | TRANSMITTING AREA | LIGHT-SHIELDING AREA | TRANSMITTING AREA | LIGHT-SHIELDING AREA | TRANSMITTING AREA | LIGHT-SHIELDING AREA |
|---|---|---|---|---|---|---|---|
| DOUBLE-RING | 0.2 | 0.1 | 0.24 | | | | |
| TRIPLE-RING | 0.19 | 0.08 | 0.2 | 0.06 | 0.1 | | |
| QUADRUPLE-RING | 0.15 | 0.05 | 0.17 | 0.03 | 0.23 | 0.01 | 0.05 |

*Fig.17*
(a)
(b)
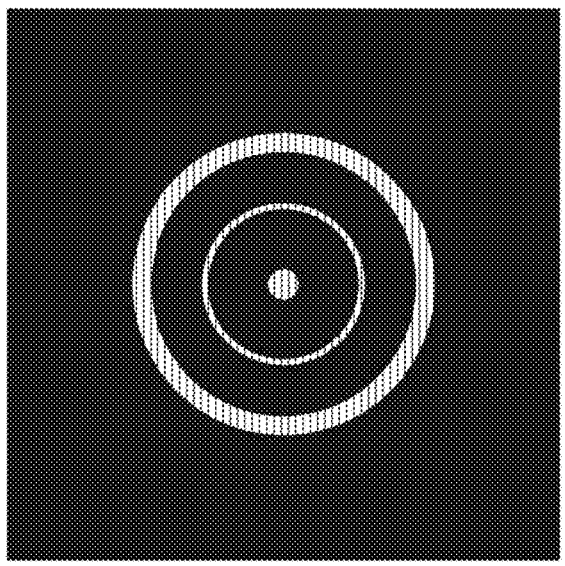
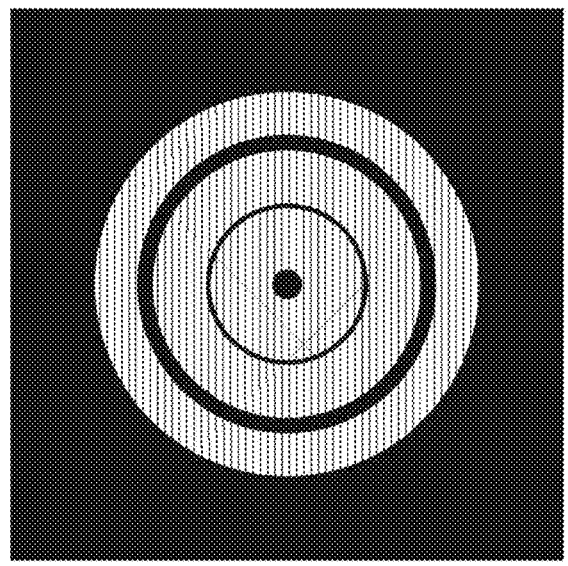

Fig.18
(a)
(b)
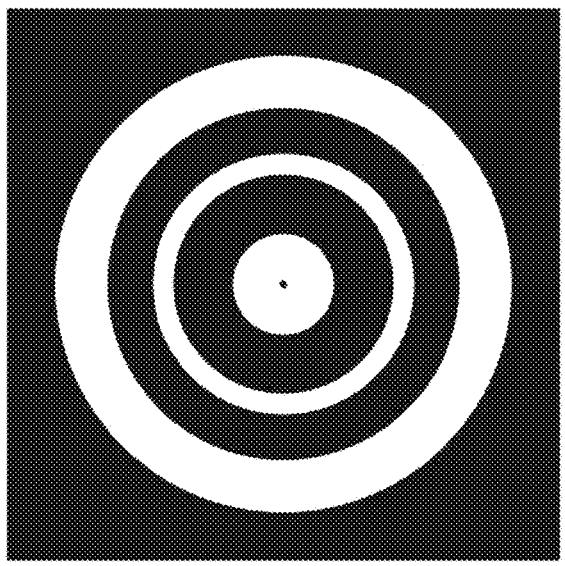
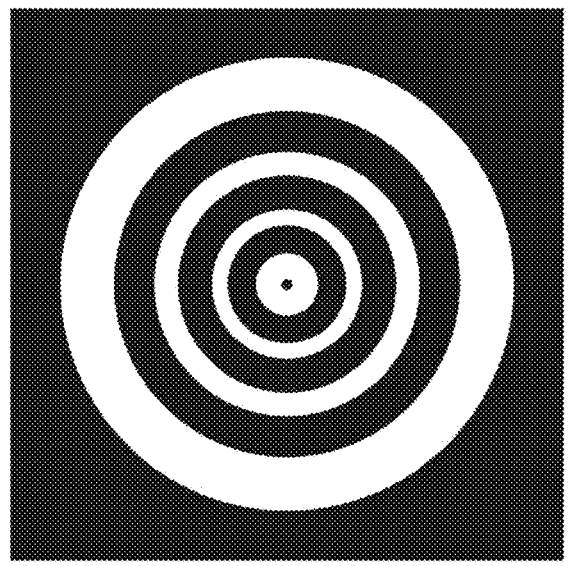

Fig.20
(a) 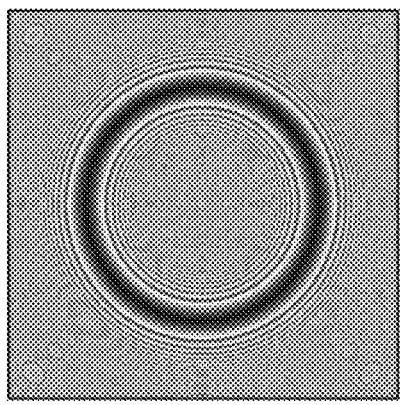 (b) 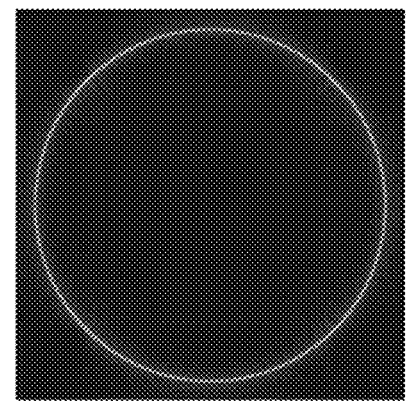
(c) 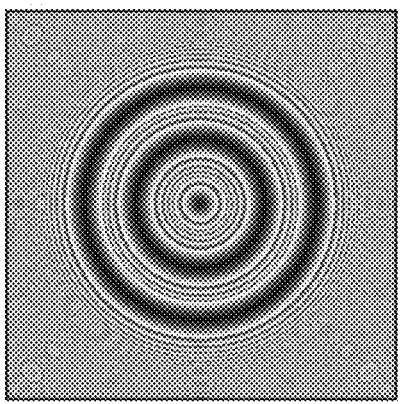 (d) 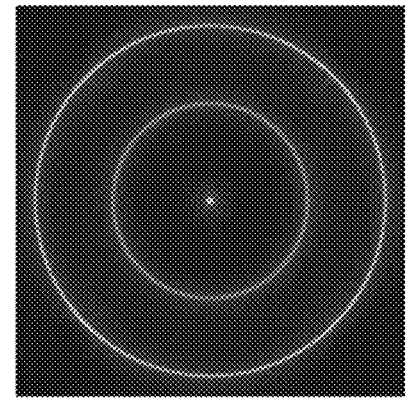

*Fig.22*
(a)
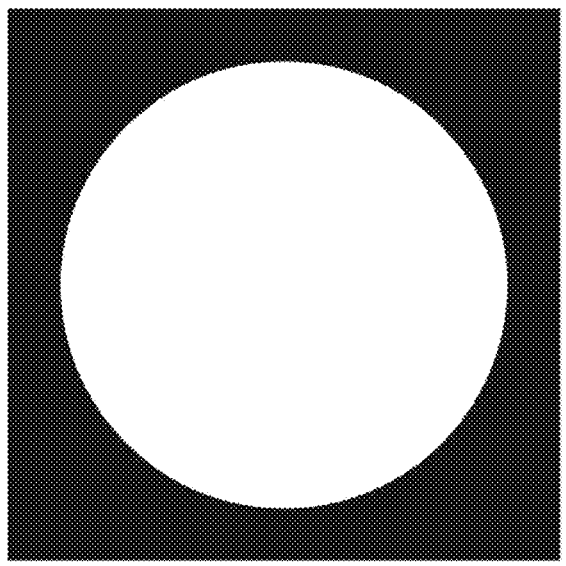
(b)
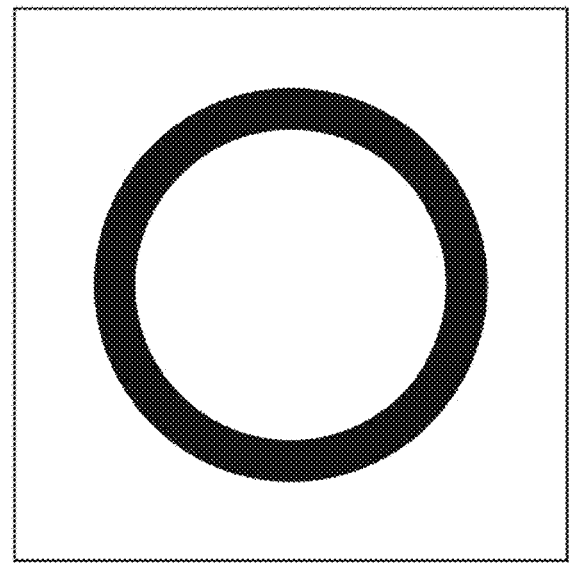
(c)
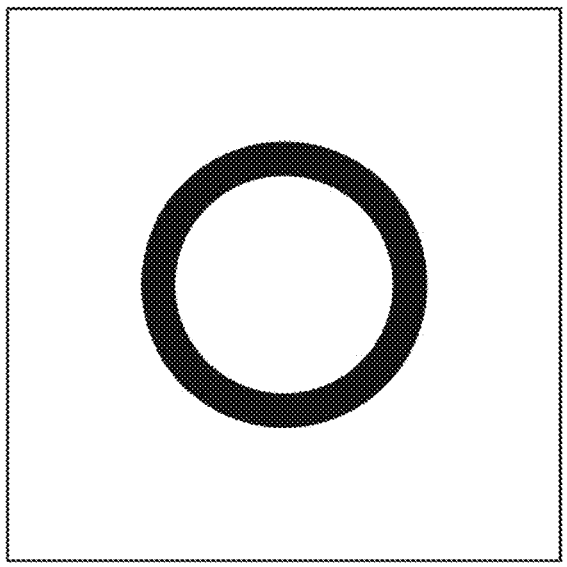
(d)
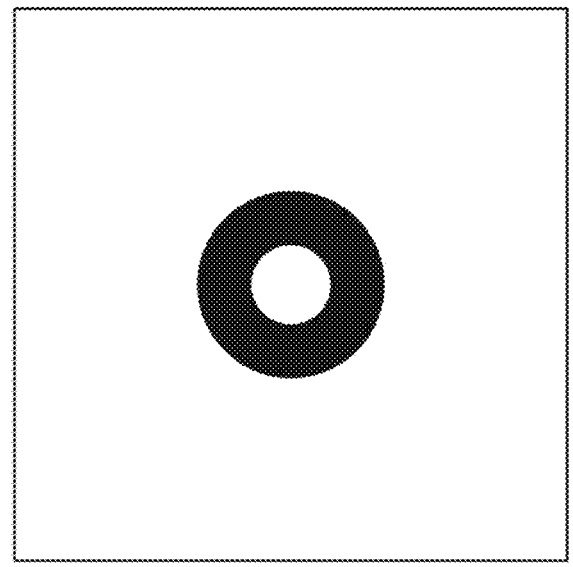

Fig.35

| | WITHOUT MASK | QUADRUPLE-RING MASK | SAX (fourth-order) | SAX (fourth-order) + RING MASK | SAX (sixth-order) | SAX (sixth-order) + RING MASK |
|---|---|---|---|---|---|---|
| RADIAL DIRECTION (nm) | 240 | 212 | 171 | 146 | 140 | 118 |
| AXIAL DIRECTION (nm) | 638 | 543 | 454 | 347 | 373 | 272 |

MULTI-RING MASK, LIGHT IRRADIATION DEVICE, OPTICAL MICROSCOPE, AND PHOTOACOUSTIC MICROSCOPE

TECHNICAL FIELD

The present disclosure relates to a multi-ring mask for spatially intensity-modulating input light in a beam cross-section and outputting modulated light, a light irradiation apparatus including the multi-ring mask, and an optical microscope and a photoacoustic microscope including the light irradiation apparatus.

BACKGROUND ART

When an observation object is observed or a processing object is processed, light output from a light source such as a laser light source is focused and applied to a surface or an inside of an object (observation object or processing object) through a focusing optical system including a lens and the like. When the light is focused as described above, it is known that a beam waist diameter, being a measure of a size of a focusing diameter, can be reduced to only about half a wavelength of the light. This is called a diffraction limit. Patent Document 1 and Non Patent Document 1 describe techniques for focusing the light in a region smaller than the diffraction limit.

A technique of a light irradiation apparatus described in Non Patent Document 1 (hereinafter referred to as "conventional art 1") uses a single-ring mask. The single-ring mask has a single ring-shaped light-shielding area, and transmitting areas respectively provided inside and outside the light-shielding area. In the conventional art 1, the single-ring mask is disposed between the light source and a focusing position by the focusing optical system, and light passing through the transmitting areas inside and outside the light-shielding area of the single-ring mask reaches the focusing position. At the focusing position, two light beams interfere with each other, so that light can be focused on a region smaller than the diffraction limit.

A technique of a light irradiation apparatus described in Patent Document 1 (hereinafter referred to as "conventional art 2") uses a multi-ring mask. The multi-ring mask used in the conventional art 2 includes a plurality of ring-shaped light-shielding areas, and transmitting areas provided between the plurality of light-shielding areas, and the light-shielding areas and the transmitting areas are alternately provided. Further, in the multi-ring mask, a radial width of the ring-shaped light-shielding area or the transmitting area increases as a distance from a center position increases. In the conventional art 2, the multi-ring mask is disposed between the light source and a focusing position by the focusing optical system, and light passing through the transmitting areas of the multi-ring mask reaches the focusing position. In the conventional art 2 also, light can be focused on a region smaller than the diffraction limit.

CITATION LIST

Patent Literature

Patent Document 1: Japanese Patent Publication No. 5144212

Non Patent Literature

Non Patent Document 1: Ryosuke Oketani, et al, "Saturated two-photon excitation fluorescence microscopy with core-ring illumination," Optics Letters, Vol. 42, No. 3, pp. 571-574 (2017).

SUMMARY OF INVENTION

Technical Problem

In the conventional arts 1 and 2, although light can be focused on a region smaller than the diffraction limit at the focusing position, a part of the light may be focused on a region different from the above region, and further, a size or a shape of the focusing region may not be as intended.

The present invention has been made to solve the above problem, and an object thereof is to provide a light irradiation apparatus capable of efficiently focusing light on a region smaller than a diffraction limit. Further, an object is to provide a multi-ring mask suitable for use in the light irradiation apparatus. Further, an object is to provide an optical microscope and a photoacoustic microscope including the light irradiation apparatus and capable of acquiring an image with high spatial resolution.

Solution to Problem

A first aspect of the present invention is a multi-ring mask. The multi-ring mask is a multi-ring mask for spatially intensity-modulating input light in a beam cross-section and outputting modulated light, and includes a plurality of ring-shaped light-shielding areas provided around a center position; a transmitting area provided between two adjacent light-shielding areas out of the plurality of light-shielding areas; an innermost transmitting area provided inside an innermost light-shielding area out of the plurality of light-shielding areas; and an outermost transmitting area provided outside an outermost light-shielding area out of the plurality of light-shielding areas, and a radial width of each of the two adjacent light-shielding areas out of the plurality of light-shielding areas is larger than a radial width of the transmitting area provided between the two light-shielding areas.

A second aspect of the present invention is a light irradiation apparatus. The light irradiation apparatus includes a light source for outputting coherent light; a focusing optical system for focusing light output from the light source; and the above-described multi-ring mask provided on an optical path between the light source and a focusing position by the focusing optical system.

A third aspect of the present invention is an optical microscope. The optical microscope includes the above-described light irradiation apparatus for focusing light on a surface or an inside of an object to irradiate the object; and a photodetection apparatus for detecting light generated in the object in response to light irradiation on the object by the light irradiation apparatus.

A fourth aspect of the present invention is a photoacoustic microscope. The photoacoustic microscope includes the above-described light irradiation apparatus for focusing pulsed light on a surface or an inside of an object to irradiate the object; and an acoustic wave detection apparatus for detecting an acoustic wave generated in the object in response to pulsed light irradiation on the object by the light irradiation apparatus.

Advantageous Effects of Invention

According to the aspects of the present invention, light can be efficiently focused on a region smaller than a diffraction limit. Further, it is possible to realize a microscope capable of acquiring an image with high spatial resolution.

BRIEF DESCRIPTION OF DRAWINGS

FIG. 8 is a diagram illustrating the multi-ring mask of a conventional art 2 and the multi-ring mask of the present embodiment in comparison.

FIG. 10 is a diagram illustrating the multi-ring mask of the conventional art 2 and the multi-ring mask of the present embodiment in comparison.

FIG. 11 is a table showing radial widths of light-shielding areas and transmitting areas in the multi-ring masks of the conventional art 2 illustrated in an upper part of FIG. 8.

FIG. 12 is a table showing radial widths of light-shielding areas and transmitting areas in the multi-ring masks of the present embodiment illustrated in a lower part of FIG. 8.

FIG. 17 includes (a), (b) diagrams illustrating grating patterns presented on an SLM in the case where the multi-ring mask is formed using the SLM of a phase modulation type.

FIG. 18 includes (a), (b) diagrams illustrating configurations of modifications of the multi-ring mask in the present embodiment.

FIG. 20 includes (a)-(d) diagrams illustrating examples of a pattern of a toroidal lens and a ring pattern projected by the pattern.

FIG. 22 includes (a)-(d) diagrams illustrating a configuration example of the multi-ring mask in which a plurality of masks are stacked.

FIG. 35 is a table showing sizes of the PSF in various cases in a radial direction and an axial direction.

DESCRIPTION OF EMBODIMENTS

Hereinafter, embodiments for carrying out the present invention will be described in detail with reference to the accompanying drawings. In the description of the drawings, the same elements will be denoted by the same reference signs, and redundant description will be omitted. The present invention is not limited to these examples, and the Claims, their equivalents, and all the changes within the scope are intended as would fall within the scope of the present invention.

Figure 1:
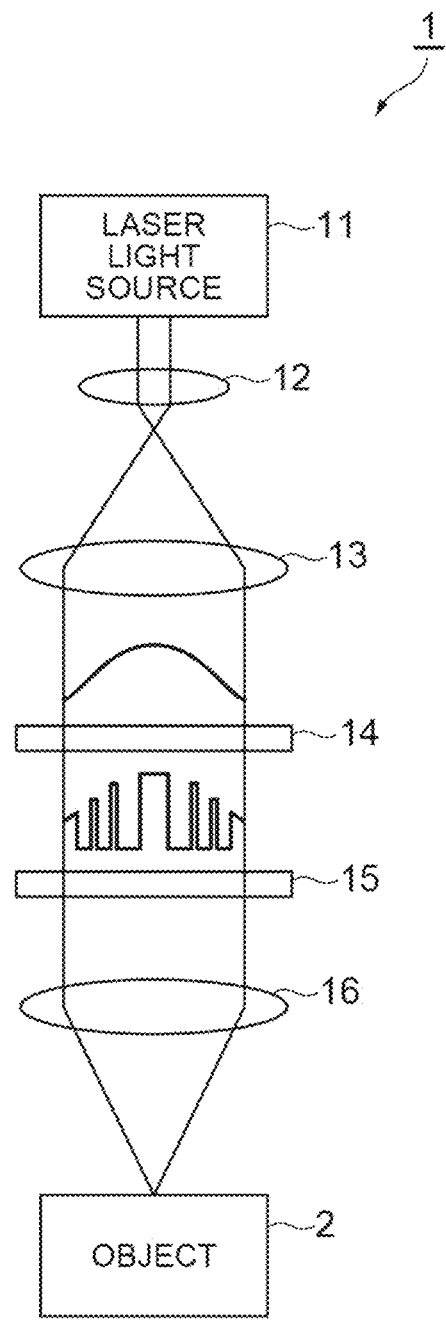
FIG. 1 is a diagram illustrating a configuration of a light irradiation apparatus 1 including a single-ring mask or a multi-ring mask.

FIG. 1 is a diagram illustrating a configuration of a light irradiation apparatus 1 including a single-ring mask or a multi-ring mask. The light irradiation apparatus 1 focuses light on a surface or an inside of an object 2 to observe or process the object 2, and includes a laser light source 11, a lens 12, a lens 13, a mask 14, a wave plate 15, and a lens 16.

The laser light source 11 outputs coherent laser light, and is, for example, a He—Ne laser light source or the like. The laser light source 11 may be a continuous oscillation type or a pulsed oscillation type. The pulsed-oscillation laser light source may be configured such that a pulse width can be adjusted by an optical fiber. Examples of the pulsed laser include a nano-pico-femtosecond laser. The lens 12 and the lens 13 function as a beam expander, input light output from the laser light source 11, expand a beam diameter of the light, and output the light as parallel light.

The mask 14 inputs the light with the expanded beam diameter output from the beam expander including the lens 12 and the lens 13, spatially intensity-modulates the light in a beam cross-section, and outputs modulated light to the wave plate 15. The mask 14 includes a ring-shaped light-shielding area, and transmitting areas provided respectively in contact with an inside and an outside of the light-shielding area. The mask 14 is a single-ring mask in the conventional art 1, and is a multi-ring mask in the conventional art 2 and the present embodiment. In this diagram, an example of a light intensity distribution in the beam cross-section of the light input to the mask 14 is illustrated, and an example of a light intensity distribution in the beam cross-section of the light output from the mask 14 is illustrated. The mask 14 may be provided at the subsequent stage of the lens 16.

The wave plate 15 inputs the light output from the mask 14, controls a polarization of the light, and outputs the light. The lens 16 is a focusing optical system for inputting the light output from the wave plate 15 and focusing the light on the surface or in the inside of the object 2.

Hereinafter, the single-ring mask and the multi-ring mask will be described. In a diagram illustrating a configuration of the mask, the mask is viewed in an optical axis direction, a light-shielding area is illustrated by a black region, and a transmitting area is illustrated by a white region. Further, a problem of the single-ring mask of the conventional art 1 will be described, and then, the multi-ring mask of the present embodiment will be described in comparison with the multi-ring mask of the conventional art 2.

Figure 2:
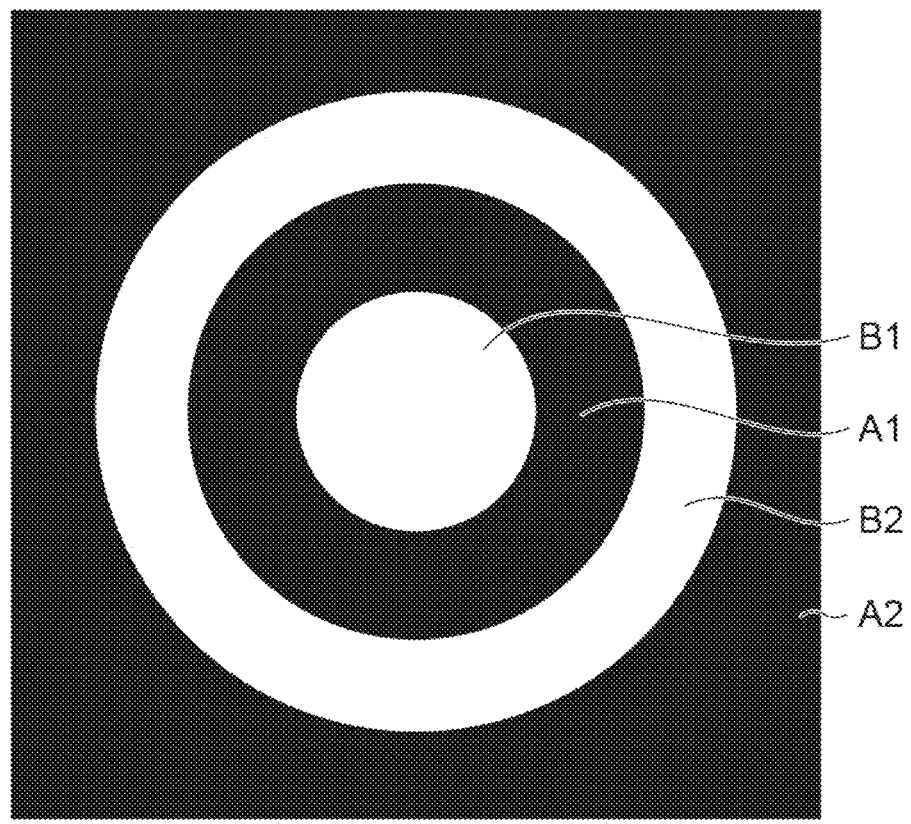
FIG. 2 is a diagram illustrating a configuration of the single-ring mask.

FIG. 2 is a diagram illustrating a configuration of the single-ring mask. The single-ring mask includes a single ring-shaped light-shielding area A1 provided around a center position. In addition, the single-ring mask includes a transmitting area B1 provided inside the light-shielding area A1, a ring-shaped transmitting area B2 provided outside the light-shielding area A1, and a light-shielding area A2 provided outside the transmitting area B2. The light irradiation apparatus of the conventional art 1 uses the single-ring mask.

Figure 3:
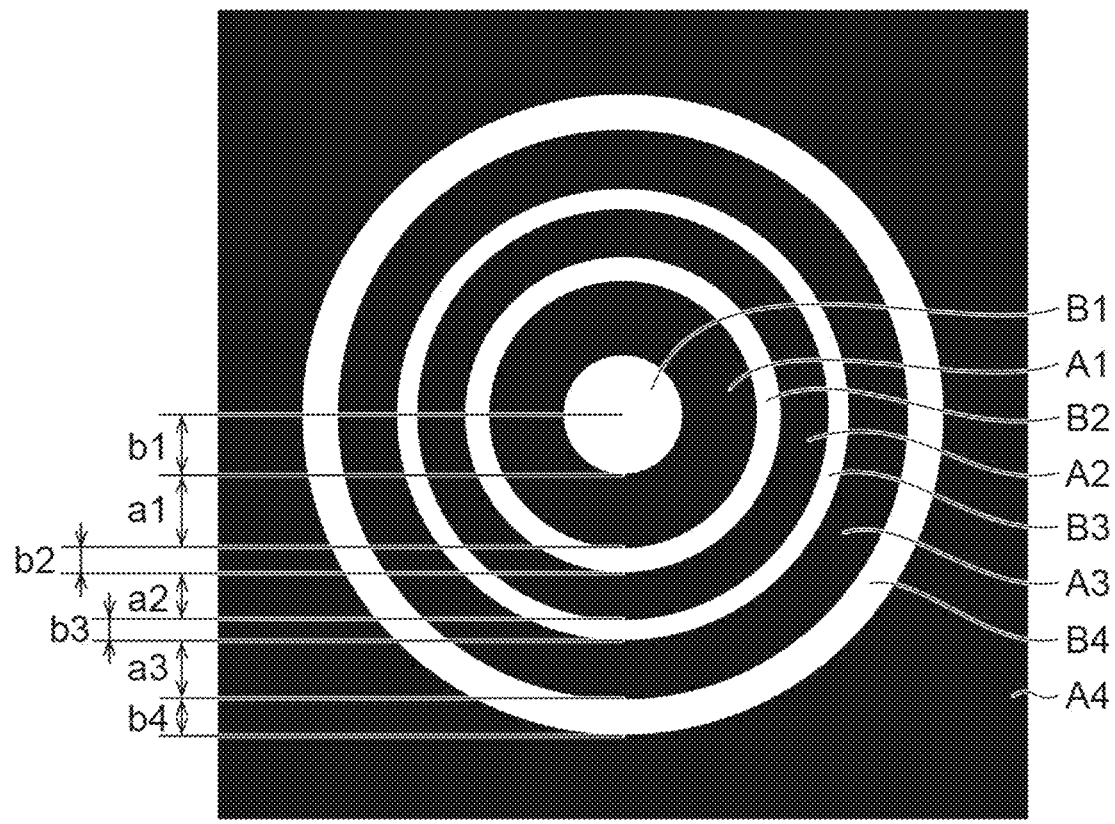
FIG. 3 is a diagram illustrating a configuration of the multi-ring mask.

FIG. 3 is a diagram illustrating a configuration of the multi-ring mask. The multi-ring mask includes a plurality of (three in the figure) ring-shaped light-shielding areas A1, A2, and A3 provided around the center position. In addition, the multi-ring mask includes an innermost transmitting area B1 provided inside the light-shielding area A1, a ring-shaped transmitting area B2 provided between the light-shielding area A1 and the light-shielding area A2, a ring-shaped transmitting area B3 provided between the light-shielding area A2 and the light-shielding area A3, a ring-shaped outermost transmitting area B4 provided outside the light-shielding area A3, and a light-shielding area A4 provided outside the transmitting area B4.

A light transmittance in the transmitting areas B1 to B4 is larger than a light transmittance in the light-shielding areas A1 to A4. The light transmittance in the transmitting areas B1 to B4 may be 1, or less than 1. The light transmittance in the light-shielding areas A1 to A4 may be 0, or more than 0.

A boundary between the transmitting area and the light-shielding area adjacent to each other out of the transmitting area B1, the light-shielding area A1, the transmitting area B2, the light-shielding area A2, the transmitting area B3, the light-shielding area A3, the transmitting area B4, and the light-shielding area A4 may be a concentric circle, or may be an ellipse. In the following description, it is assumed that the boundary is a circle. A radial width (radius) of the transmitting area B1 is set to b1, a radial width of the light-shielding area A1 is set to a1, a radial width of the transmitting area B2 is set to b2, a radial width of the light-shielding area A2 is set to a2, a radial width of the transmitting area B3 is set to b3, a radial width of the light-shielding area A3 is set to a3, and a radial width of the transmitting area B4 is set to b4.

In the multi-ring mask of the conventional art 2, the radial width of the ring-shaped light-shielding area or the transmitting area increases as the distance from the center position increases. That is, the multi-ring mask of the conventional art 2 has a relationship represented by the following Formula (1).

[Formula 1]

$$b1<a1<b2<a2<b3<a3<b4 \quad (1)$$

On the other hand, in the multi-ring mask of the present embodiment, the radial width of each of two adjacent light-shielding areas out of the ring-shaped light-shielding areas A1, A2, and A3 is larger than the radial width of the transmitting area provided between these two light-shielding areas. That is, the multi-ring mask of the present embodiment has a relationship represented by the following Formula (2) for the radial widths of the light-shielding areas A1, A2, and the transmitting area B2, and has a relationship represented by the following Formula (3) for the radial widths of the light-shielding areas A2, A3, and the transmitting area B3. It is preferable that all combinations of two adjacent ring-shaped light-shielding areas have such a relationship.

[Formula 2]

$$b2<a1$$

$$b2<a2 \quad (2)$$

[Formula 3]

$$b3<a2$$

$$b3<a3 \quad (3)$$

In order to realize high resolution processing or measurement, an object is irradiated with light focused by a lens. An intensity distribution of the focused light has a spread according to a wavelength of the light and a performance of the lens. This spread is called a point spread function (PSF). When the light is circularly polarized light or linearly polarized light, the PSF has an elliptical sphere which is longer in a direction parallel to the optical axis direction than in a direction perpendicular to the optical axis direction.

In the measurement, a result obtained by convolution of the PSF and an object shape is an observation image. In the experiment, when the object much smaller than the performance (diffraction limit) which can be focused by the lens is observed, an image having substantially the same size as the PSF can be observed. Reducing the PSF leads to increasing an optical resolution of a microscope. In general, an objective lens having a large NA is used to reduce the PSF.

Each of the single-ring mask and the multi-ring mask is a mask of an amplitude modulation type having the ring-shaped light-shielding area. The PSF can be reduced by focusing the light transmitted through the transmitting area of the mask.

Figure 4:
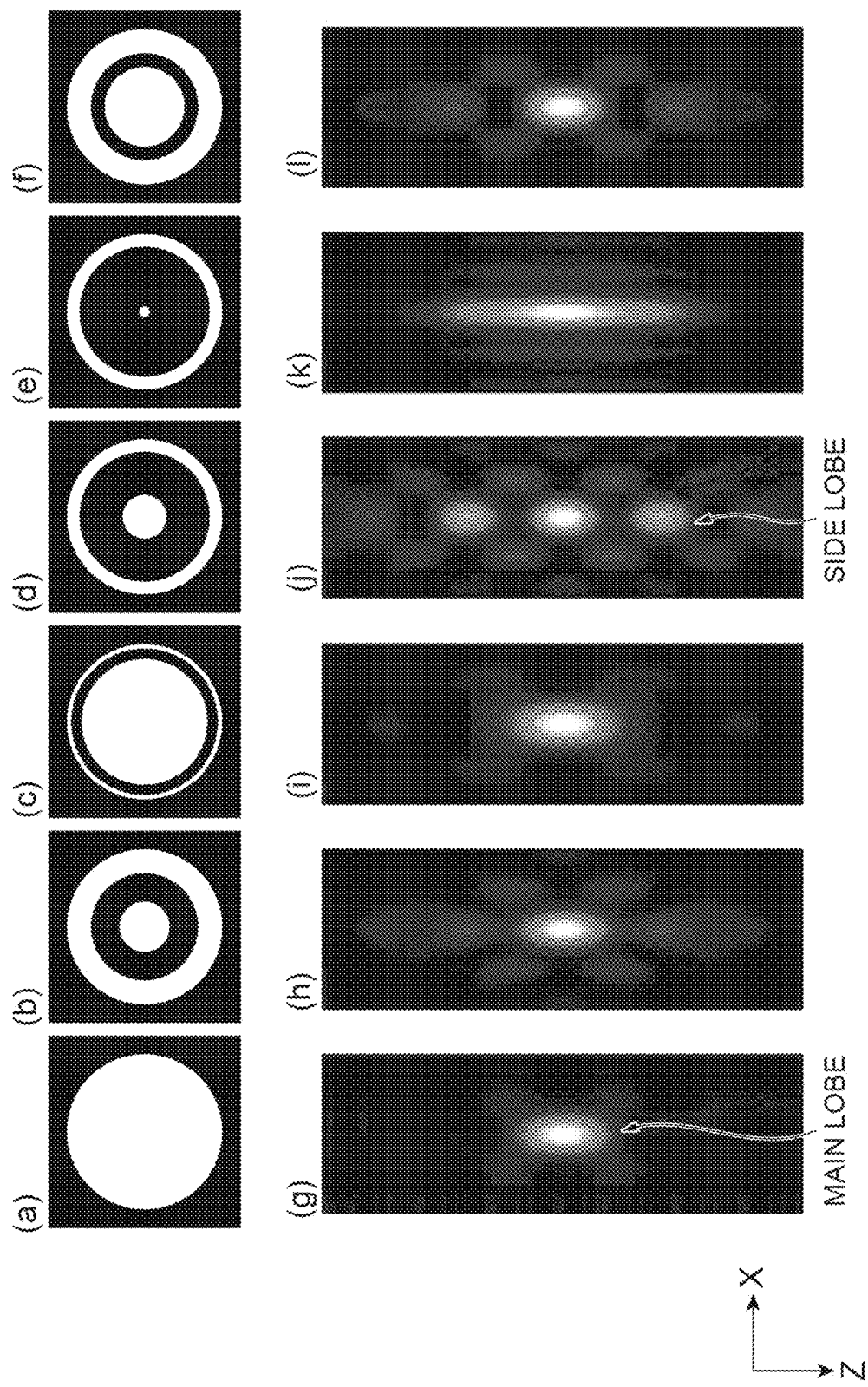
FIG. 4 includes (a)-(l) diagrams illustrating various configuration examples and PSFs of the mask.

FIG. 4 includes diagrams illustrating various configuration examples and PSFs of the mask. (a) in FIG. 4 illustrates a configuration of the mask including a single transmitting area of a circular region, and a light-shielding area provided around the transmitting area. (b) to (f) in FIG. 4 illustrate configuration examples of the single-ring mask. (g) to (f) in FIG. 4 illustrate PSFs in a plane (xz plane) including the optical axis (z axis) of the lens. (g) in FIG. 4 illustrates the PSF when the mask of the configuration of (a) in FIG. 4 is used. (h) in FIG. 4 illustrates the PSF when the single-ring mask of the configuration of (b) in FIG. 4 is used. (i) in FIG. 4 illustrates the PSF when the single-ring mask of the configuration of (c) in FIG. 4 is used. (j) in FIG. 4 illustrates the PSF when the single-ring mask of the configuration of (d) in FIG. 4 is used. (k) in FIG. 4 illustrates the PSF when the single-ring mask of the configuration of (e) in FIG. 4 is used. (l) in FIG. 4 illustrates the PSF when the single-ring mask of the configuration of (f) in FIG. 4 is used.

As can be seen from the diagrams, a size and a shape of the PSF varies depending on an inner diameter and an outer diameter of the ring-shaped light-shielding area. Compared to the PSF ((g) in FIG. 4) in the case of using the mask of (a) in FIG. 4, the PSF can be reduced ((h) in FIG. 4) in the case where the inner diameter and the outer diameter of the ring-shaped light-shielding area are appropriately set ((b) in FIG. 4). However, when the inner diameter and the outer diameter of the ring-shaped light-shielding area are not appropriately set ((c) to (e) in FIG. 4), the PSF may become large ((i) in FIG. 4), regions (side lobes) with high light intensity may be generated above and below a main focusing region (main lobe) ((j) in FIG. 4), or the PSF may become long in the optical axis direction ((k) in FIG. 4).

When the side lobe with high light intensity is generated in addition to the main lobe, it is observed as if three fluorescence regions exist in the optical axis direction as in triple focus observation, or a decrease in a SN ratio of an image occurs. As described above, even in the case of the single-ring mask, it is important to appropriately design the inner diameter and the outer diameter of the ring-shaped light-shielding area in order to reduce the PSF. Non Patent Document 1 attempts to determine the configuration of the single-ring mask such that the light intensity of the side lobe is small and the region of the main lobe is small.

Figure 5:
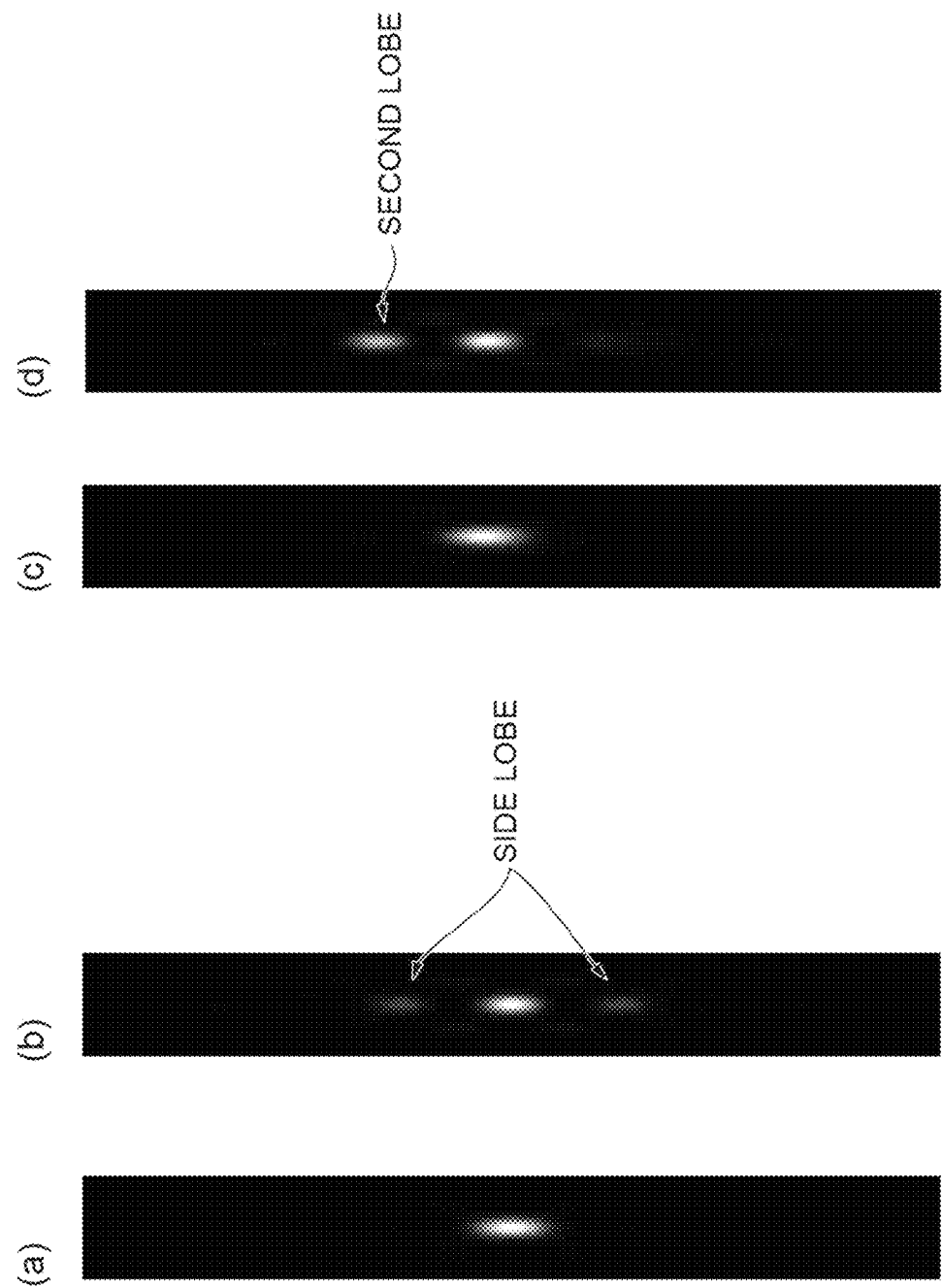
FIG. 5 includes (a)-(d) diagrams illustrating fluorescence generation regions in respective cases with/without the single-ring mask and with/without an aberration medium.

FIG. 5 includes diagrams illustrating fluorescence generation regions in respective cases in which the single-ring mask is used/not used and with/without an aberration medium. The diagram illustrates the region where fluorescence is generated by two-photon absorption of excitation light. (a) in FIG. 5 illustrates the fluorescence generation region in the case without the single-ring mask and without the aberration medium. (b) in FIG. 5 illustrates the fluorescence generation region in the case with the single-ring mask and without the aberration medium. (c) in FIG. 5 illustrates the fluorescence generation region in the case without the single-ring mask and with the aberration medium. (d) in FIG. 5 illustrates the fluorescence generation region in the case with the single-ring mask and with the aberration medium.

As can be seen from the diagrams, in a resolution improvement method using the single-ring mask, it is not easy to obtain a desired resolution during internal observation of a thick living tissue or internal processing of a glass. In the living body internal observation or the internal processing, light is focused on the inside of the object having a refractive index different from a refractive index of air or an immersion liquid. In this case, a spherical aberration occurs due to the refractive index difference, and thus, the excitation light spatially amplitude-modulated by the single-ring mask is significantly affected even when a value of the spherical aberration is small.

When the excitation light is focused and applied to the surface of the object using a water immersion objective lens, and the fluorescence is generated by a multi-photon absorption process from a fluorescent material smaller than the diffraction limit on the object surface, there is no aberration, and thus, the region of the main lobe can be reduced in the case of using the single-ring mask ((b) in FIG. 5), compared to the case of not using the single-ring mask ((a) in FIG. 5).

When the excitation light is applied to the inside (70 µm depth position) of the living body (average refractive index 1.38), and the fluorescence is generated by a multi-photon absorption process from a small fluorescent material at the position, there is an aberration, and thus, a spot having high fluorescence intensity is generated at substantially the same position as the side lobe in the case of using the single-ring mask ((d) in FIG. 5), compared to the case of not using the single-ring mask ((c) in FIG. 5). In the following description, the above bright spot occurring in the presence of aberration is referred to as a second lobe. The second lobe also leads to deterioration of the measurement image similarly to the side lobe.

In addition, the spherical aberration occurring under the above conditions is very small. When the single-ring mask is not used, the PSF slightly extends in the optical axis direction ((c) in FIG. 5). However, when the single-ring mask is used, the strong second lobe occurs ((d) in FIG. 5). Thus, the single-ring mask is particularly weak with respect to the spherical aberration. In addition, the second lobe may occur at a position different from the side lobe depending on the conditions such as refractive index difference, focusing depth, NA, and the like.

As described above, in the single-ring mask, the side lobe or the second lobe may occur in addition to the main lobe, and further, the main lobe may not be made small. The multi-ring mask of the present embodiment can solve the above problems of the single-ring mask. Hereinafter, the multi-ring mask will be described.

Figure 6:
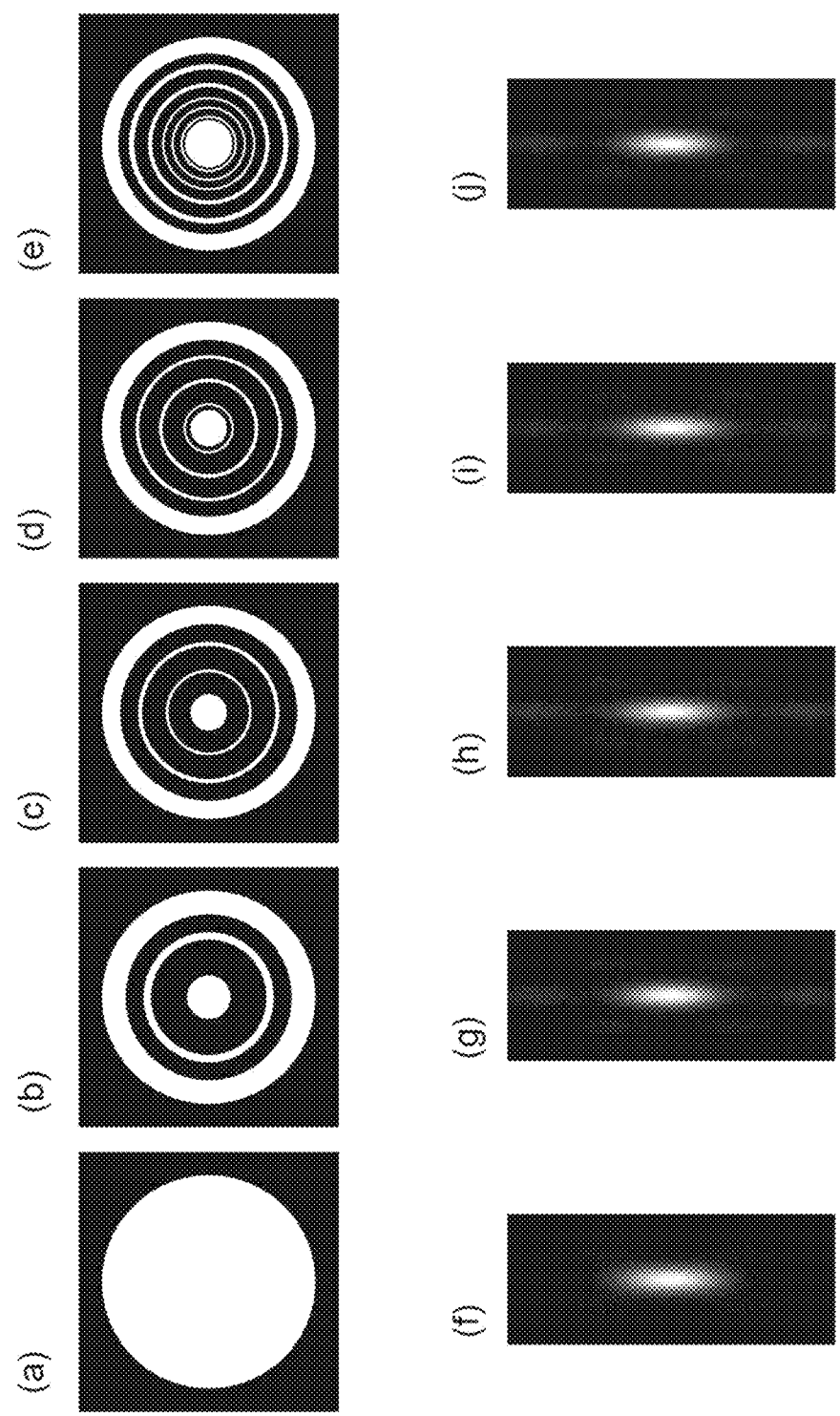
FIG. 6 includes (a)-(j) diagrams illustrating various configuration examples and PSFs of the mask.
Figure 7:
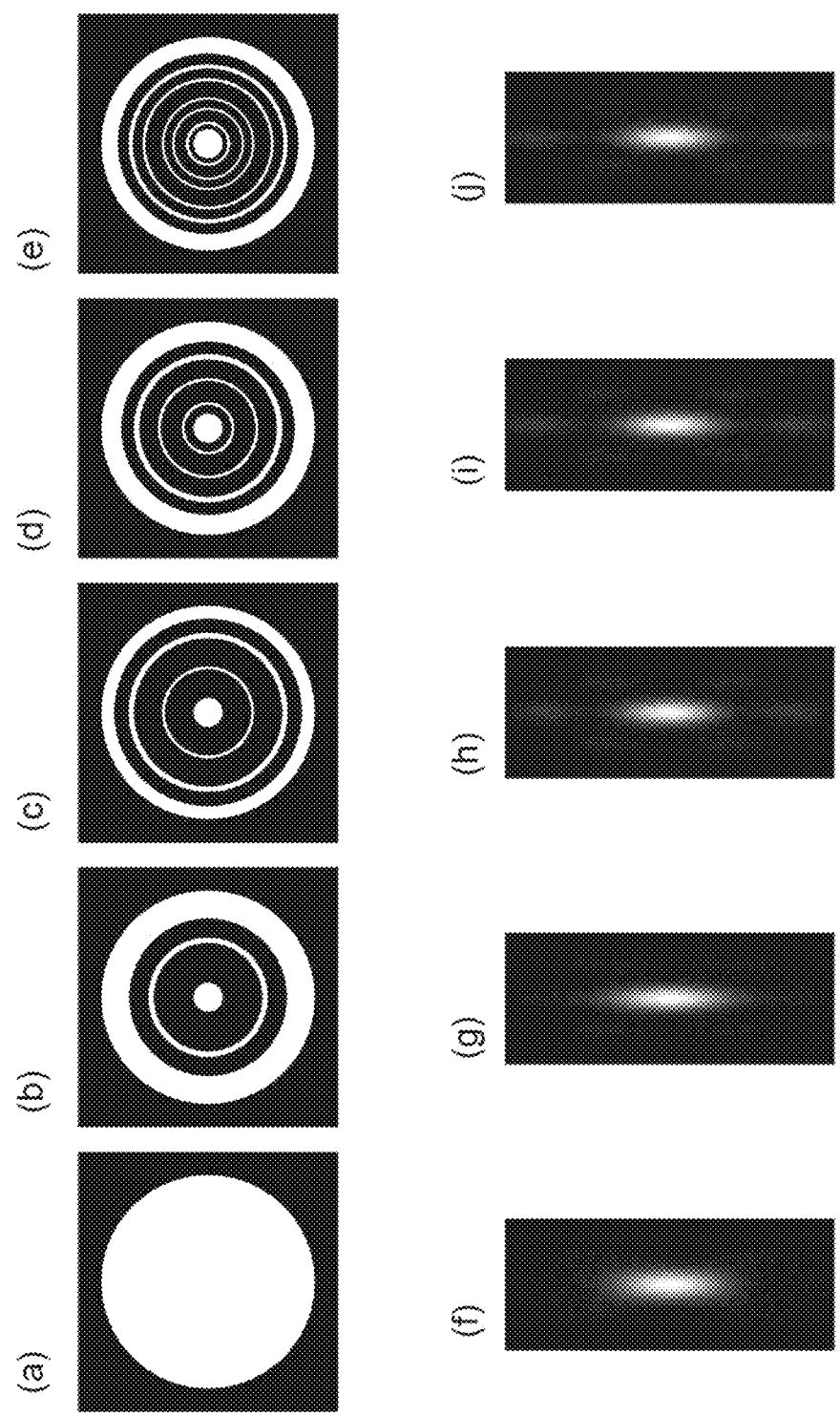
FIG. 7 includes (a)-(j) diagrams illustrating various configuration examples and PSFs of the mask.

FIG. 6 and FIG. 7 include diagrams illustrating various configuration examples and PSFs of the mask. In FIG. 6, it is assumed that the light (excitation light) input to the mask is uniform (top hat) in the beam cross-section. In FIG. 7, it is assumed that the light (excitation light) input to the mask has a Gaussian distribution with a tail cut in the beam cross-section.

In each of FIG. 6 and FIG. 7, (a) illustrates a configuration of the mask including a single transmitting area of a circular region, and a light-shielding area provided around the transmitting area. (b) illustrates a configuration of a double-ring mask. (c) illustrates a configuration of a triple-ring mask. (d) illustrates a configuration of a quadruple-ring mask. (e) illustrates a configuration of a sextuple-ring mask. (f) to (j) illustrate PSFs in the plane (xz plane) including the optical axis (z axis) of the lens for fluorescence generated by two-photon absorption of the excitation light in the object surface. (f) illustrates the PSF when the mask of the configuration of (a) is used. (g) illustrates the PSF when the double-ring mask of the configuration of (b) is used. (h) illustrates the PSF when the triple-ring mask of the configuration of (c) is used. (i) illustrates the PSF when the quadruple-ring mask of the configuration of (d) is used. (j) illustrates the PSF when the sextuple-ring mask of the configuration of (e) is used.

In each of FIG. 6 and FIG. 7, when the multi-ring mask of the present embodiment is used, the PSF of the main lobe can be made small, and a light peak intensity of the side lobe can be reduced. Further, it is possible to reduce the second lobe generated by the aberration when focused irradiation is performed on the inside of the object.

In designing the multi-ring mask of the present embodiment, referring to FIG. 3, an optimum value of a radius of a circle being a boundary between the transmitting area and the light-shielding area adjacent to each other out of the transmitting area B1, the light-shielding area A1, the transmitting area B2, the light-shielding area A2, the transmitting area B3, the light-shielding area A3, the transmitting area B4, and the light-shielding area A4 is searched. A size (for example, volume) of the main lobe and a size of the side lobe can be used for the evaluation of the optimum value search. The size of the main lobe may be a size of a focusing region of illumination light, may be a size of a region of the fluorescence generated by single-photon absorption or multi-photon absorption when the excitation light is focused and applied, or may be a size of a region in which non-linear processing is estimated to occur due to multi-photon absorption. In particular, in fluorescence emission using n-photon absorption, the magnitude of the fluorescence is proportional to the n-th power of the intensity, and thus, a ratio of the side lobe and the main lobe becomes large, and as a result, observation with a small side lobe can be realized. In addition, an observation image with a small second lobe can be obtained by designing in consideration of an aberration predicted to occur or a residual aberration which cannot be removed by a technique such as, for example, an aberration correction.

Compared to the multi-ring mask of the conventional art 2 described in Patent Document 1, the multi-ring mask of the present embodiment can further improve the resolution.

Figure 9:
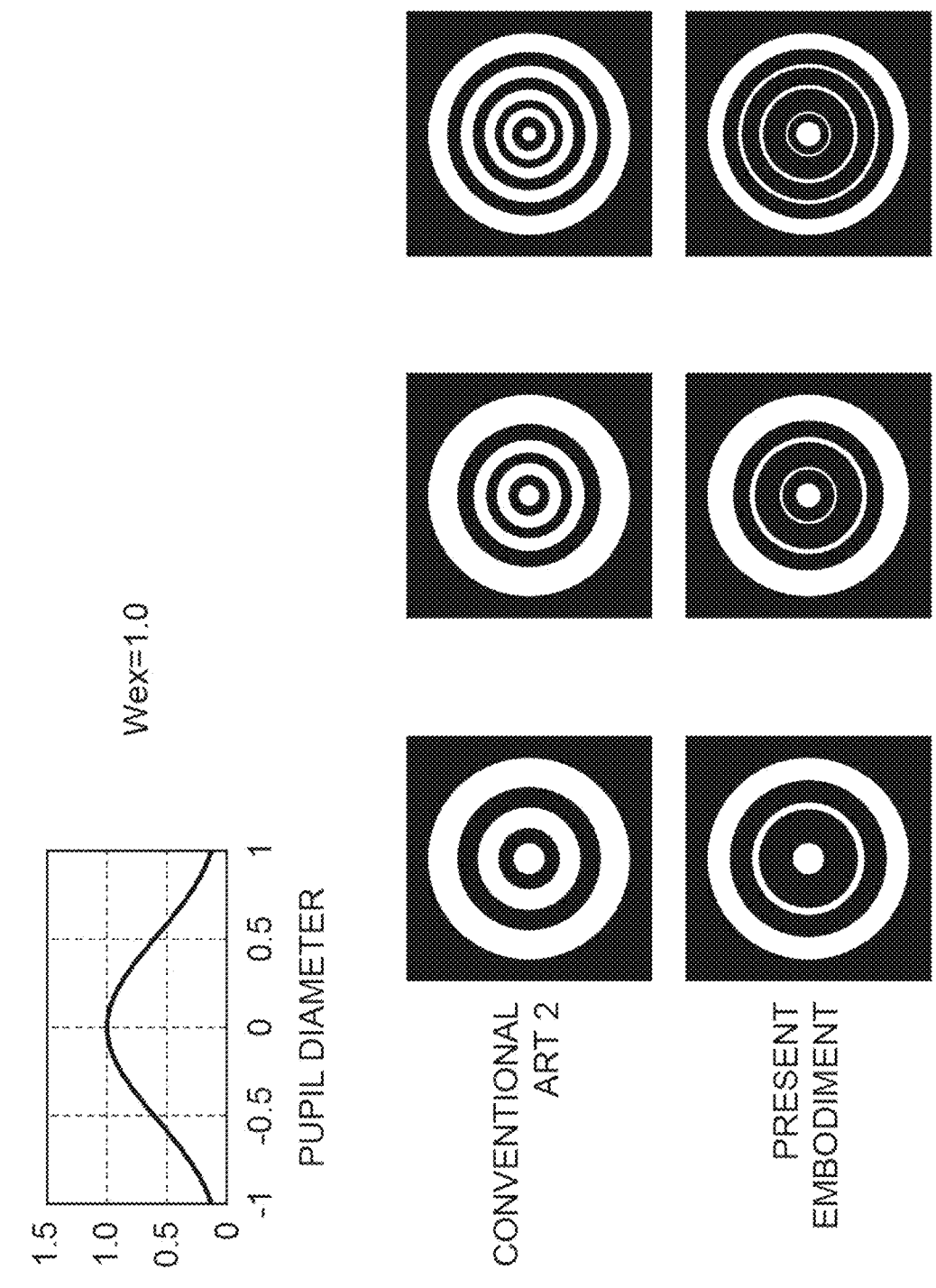
FIG. 9 is a diagram illustrating the multi-ring mask of the conventional art 2 and the multi-ring mask of the present embodiment in comparison.

FIG. 8 to FIG. 10 are diagrams illustrating the multi-ring mask of the conventional art 2 and the multi-ring mask of the present embodiment in comparison. In FIG. 8, it is assumed that the light input to the multi-ring mask is uniform (top hat) in the beam cross-section. In FIG. 9 and FIG. 10, it is assumed that the light input to the multi-ring mask has a Gaussian distribution (the following Formula (4)) with a tail being cut in the beam cross-section. In Formula (4), r is a distance from the center position when the outer radius of the outermost transmitting area is normalized as 1. Wex is a value of r at which the intensity becomes $1/e^2$ when the intensity at the center position is normalized as 1. In FIG. 9, Wex is set to 1.0, and in FIG. 10, Wex is set to 0.6.

[Formula 4]

$$I_{ex}(r) = I_{ex0} \exp\left(-\frac{2r^2}{w_{ex}^2}\right) \quad (4)$$

In each of FIG. 8 to FIG. 10, an upper part of the diagram illustrates a double-ring mask, a triple-ring mask, and a quadruple-ring mask of the conventional art 2. A lower part of the diagram illustrates a double-ring mask, a triple-ring mask, and a quadruple-ring mask of the present embodiment.

FIG. 11 is a table showing radial widths of the light-shielding areas and the transmitting areas in the multi-ring masks of the conventional art 2 illustrated in the upper part of FIG. 8. As shown in the table, in the multi-ring mask of the conventional art 2, the radial widths of the light-shielding areas and the transmitting areas have the relationship of the above Formula (1).

FIG. 12 is a table showing radial widths of the light-shielding areas and the transmitting areas in the multi-ring masks of the present embodiment illustrated in the lower part of FIG. 8. As shown in the table, in the multi-ring mask of the present embodiment, the radial widths of the light-shielding areas and the transmitting areas have the relationship of the above Formulas (2) and (3).

Figure 13:
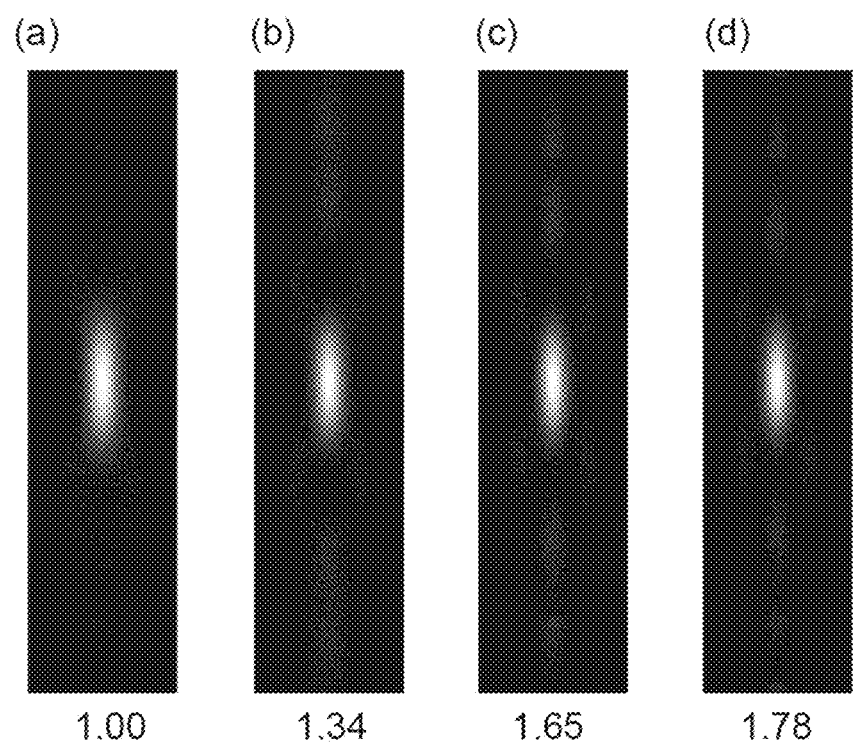
FIG. 13 includes (a)-(d) diagrams illustrating PSFs in the case where light is focused and applied to a surface of an object (in the case where there is no aberration).

FIG. 13 includes diagrams illustrating PSFs in the case where the light is focused and applied to the surface of the object (in the case where there is no aberration). It is assumed that the input light has a Gaussian distribution (Wex=1.0) with a tail cut in the beam cross-section. (a) in FIG. 13 illustrates the PSF in the case where the mask is not used. (b) in FIG. 13 illustrates the PSF when the double-ring mask of the conventional art 2 is used. (c) in FIG. 13 illustrates the PSF when the double-ring mask of the present embodiment is used. (d) in FIG. 13 illustrates the PSF when the quadruple-ring mask of the present embodiment is used.

As can be seen from the diagrams, compared to the case of not using the mask ((a) in FIG. 13), the PSF can be reduced in the case of using the double-ring mask of the conventional art 2 ((b) in FIG. 13), and further, the PSF can be further reduced in the case of using the multi-ring mask of the present embodiment ((c) in FIG. 13, (d) in FIG. 13). In addition, in the diagrams, a value of an improvement rate (to be described later) in each case is indicated. The improvement rate in the case of (b) in FIG. 13 is 1.34, the improvement rate in the case of (c) in FIG. 13 is 1.65, and the improvement rate in the case of (d) in FIG. 13 is 1.78.

Figure 14:
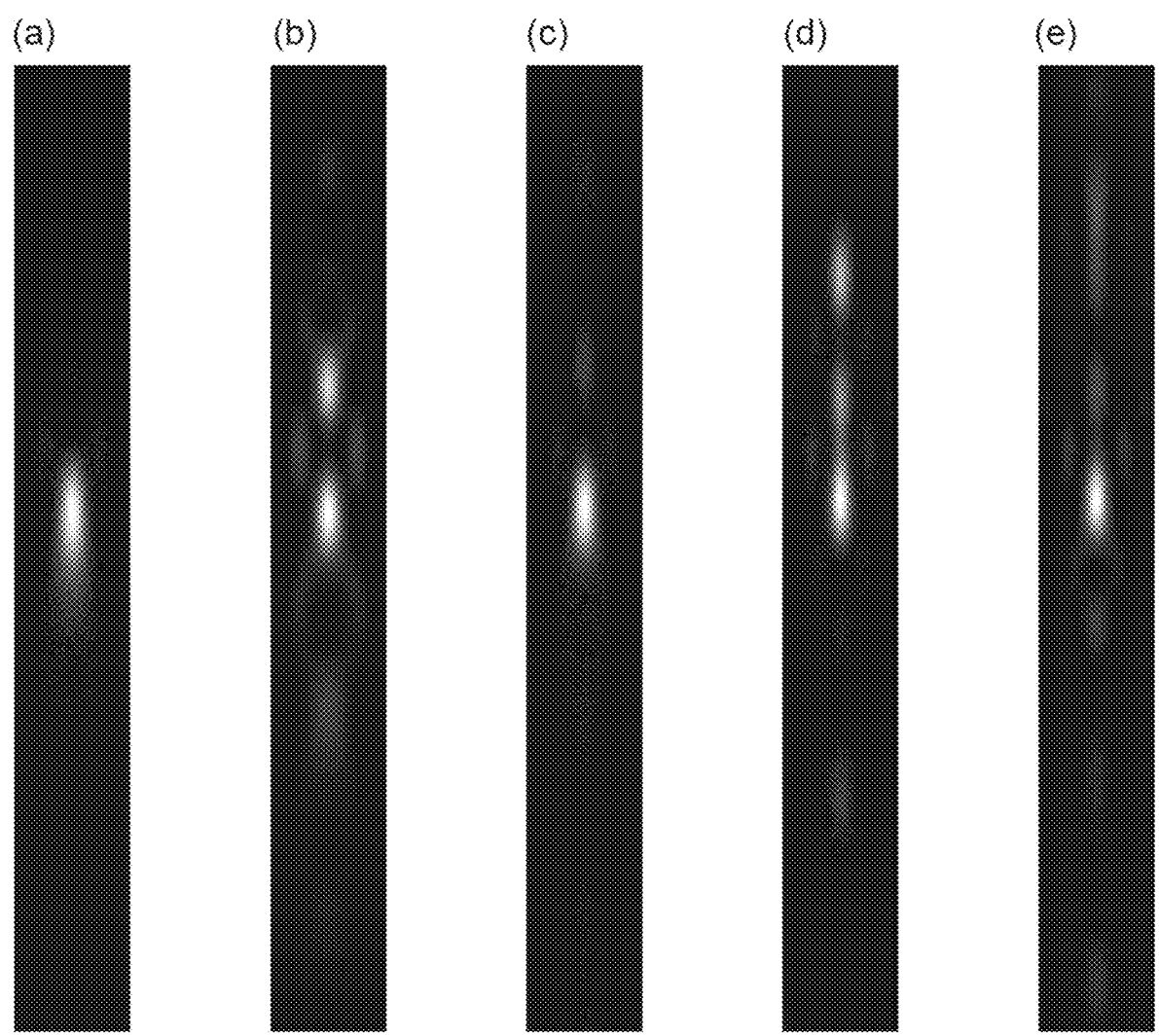
FIG. 14 includes (a)-(e) diagrams illustrating PSFs in the case where light is focused and applied to an inside of an object (in the case where there is an aberration).

FIG. 14 includes diagrams illustrating PSFs in the case where the light is focused and applied to the inside of the object (in the case where there is an aberration). It is assumed that the input light has a Gaussian distribution (Wex=1.0) with a tail cut in the beam cross-section. The PSF of the fluorescence is illustrated when the excitation light is applied to the inside (100 μm depth position) of the living body (average refractive index 1.38), and the fluorescence is generated from a small fluorescent material at the position. Under the above condition, the spherical aberration generated by the refractive index difference between the living body and air causes the second lobe when the ring mask is used. (a) in FIG. 14 illustrates the PSF in the case where the mask is not used. (b) in FIG. 14 illustrates the PSF when the single-ring mask of the conventional art 1 is used. (c) in FIG. 14 illustrates the PSF when the double-ring mask of the conventional art 2 is used. (d) in FIG. 14 illustrates the PSF when the triple-ring mask of the present embodiment in which internal focusing is not considered is used. (e) in FIG. 14 illustrates the PSF when the triple-ring mask of the present embodiment in which internal focusing is considered is used.

As can be seen from the diagrams, in the case of using the single-ring mask of the conventional art 1 ((b) in FIG. 14), the second lobe is large. In the case of using the triple-ring mask of the present embodiment in which the internal focusing is not considered ((d) in FIG. 14), the second lobe also appears. However, in the case of using the triple-ring mask of the present embodiment in which the internal focusing is considered ((e) in FIG. 14), the second lobe can be reduced and the main lobe can also be made small.

Figure 15:
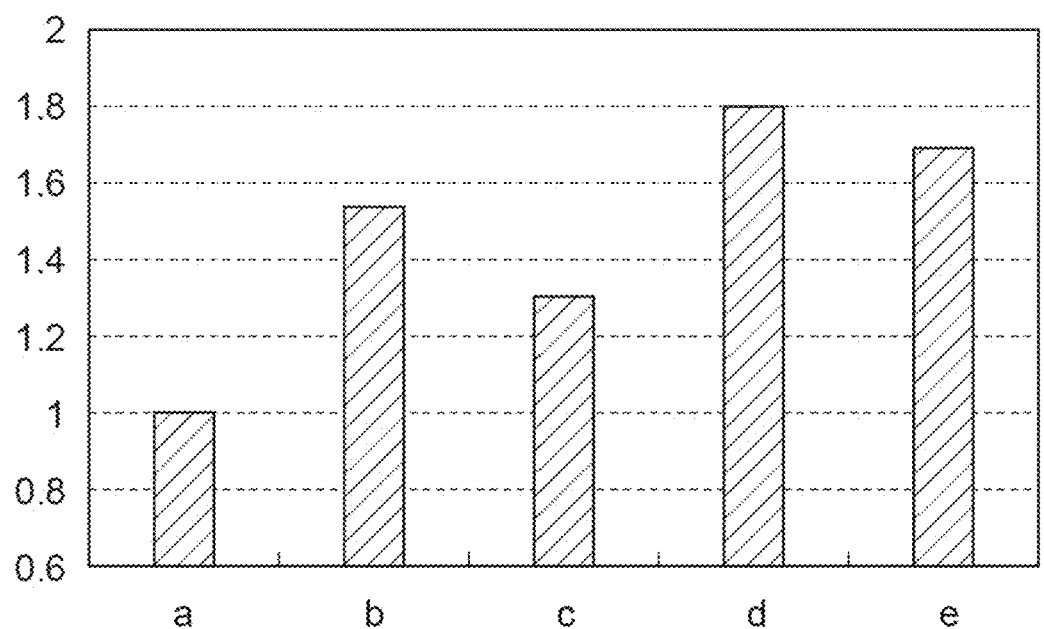
FIG. 15 is a graph showing an improvement rate for the PSF in each case illustrated in FIG. 14.
Figure 16:
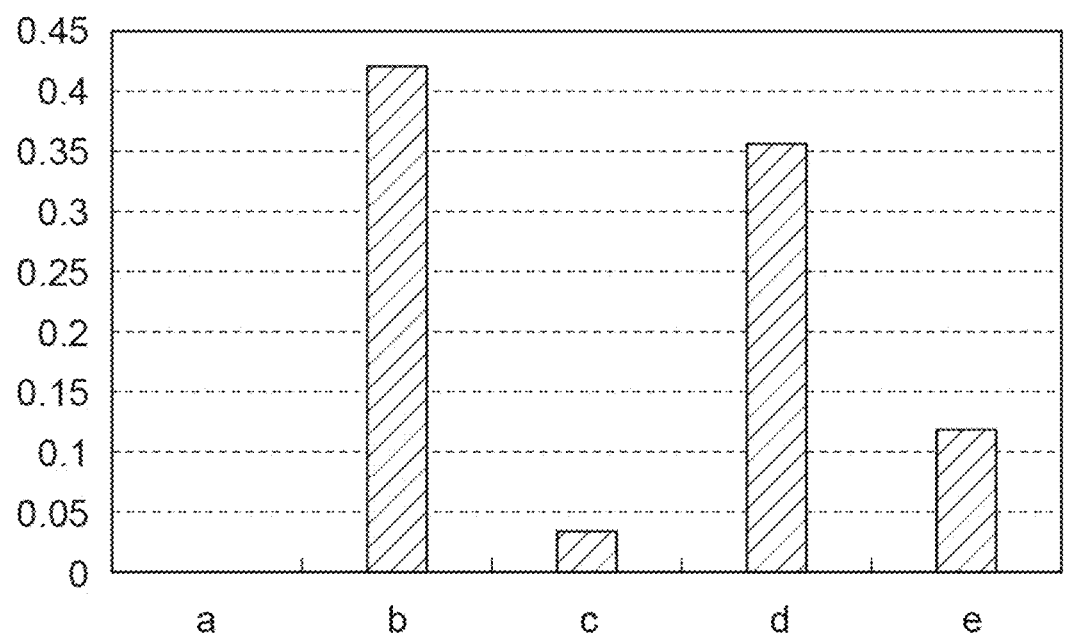
FIG. 16 is a graph showing a magnitude of a second lobe for the PSF in each case illustrated in FIG. 14.

FIG. 15 is a graph showing an improvement rate for the PSF in each case illustrated in FIG. 14. The improvement rate represents the degree of reduction of the PSF in each case based on the volume of the PSF in the case where there is no aberration and the mask is not used as a reference. The larger the improvement rate, the smaller the PSF. FIG. 16 is a graph showing a magnitude of the second lobe for the PSF in each case illustrated in FIG. 14. The second lobe represents the magnitude of unnecessary light in the case where there is an aberration, and indicates the intensity ratio with respect to the main lobe as a numerical value. The smaller the numerical value, the smaller the second lobe. As can be seen from these graphs, the multi-ring mask of the present embodiment has a high improvement rate. Further, in the case of the multi-ring mask of the present embodiment, the second lobe is larger than that of the multi-ring mask of the conventional art 2, but the second lobe is smaller than that of the single-ring mask of the conventional art 1.

The multi-ring mask of the present embodiment can be constituted by applying a light-shielding material to a region of the light-shielding area on a principal surface of a flat plate made of a transparent material (for example, glass or the like). Further, the multi-ring mask of the present embodiment can be constituted by using a spatial light modulator (SLM). The spatial light modulator may be an amplitude modulation type or may be a phase modulation type. The light-shielding areas and the transmitting areas are formed according to a pattern presented on the SLM. Examples of the SLM of the amplitude modulation type include a transmission type such as a thin-film-transistor (TFT) monitor and a reflection type such as a digital mirror device (DMD).

FIG. 17 includes diagrams illustrating grating patterns being presented on the SLM in the case where the multi-ring mask is constituted using the SLM of the phase modulation type. In the diagram, a hatched region is a region in which the grating is presented, and can generate first-order diffracted light. A black region is a region in which no grating is presented, and outputs zero-order light without generating the first-order diffracted light. The SLM outputs the zero-order light and the first-order diffracted light in directions different from each other. In (a) in FIG. 17, a region in which the grating pattern is presented is used as the transmitting area, and in this case, the first-order diffracted light out of the zero-order light and the first-order diffracted light output from the SLM is selectively focused by the lens, and the zero-order light is blocked. In (b) in FIG. 17, a region in which the grating pattern is not presented is used as the light-shielding area, and in this case, the zero-order light out of the zero-order light and the first-order diffracted light output from the SLM is selectively focused by the lens, and the first-order diffracted light is blocked. When the SLM is used, a wave plate is disposed at the subsequent stage of the SLM, and a polarization is arbitrarily controlled by the wave plate.

A region of at least two pixels is required for presenting the grating pattern on the SLM. The radial width of the transmitting area is smaller than that of the light-shielding area in the multi-ring mask of the present embodiment, and thus, the case of focusing using the zero-order light ((b) in FIG. 17) is more preferable than the case of focusing using the first-order diffracted light ((a) in FIG. 17), in consideration of diffraction efficiency.

In the present embodiment, it is also effective to perform aberration correction using the SLM or the like. Aberrations may be present not only in the object but also in the optical system including the SLM. By reducing a phase difference by the aberration correction, good focusing can be performed. However, there may be an aberration (residual aberration) remained due to an imperfect aberration correction, and further, there may be an aberration in a short time generated by an unexpected or insuppressible cause. For example, for an immersion liquid interposed between the lens and the object, an aberration occurs due to a schlieren phenomenon or the like in which a refractive index becomes non-uniform due to convection of the immersion liquid caused by temperature unevenness, dissolution of contents from the object into the immersion liquid, or the like. Further, for the object, an aberration occurs due to a refractive index difference between the object surface and the immersion liquid or a variation in refractive index due to the internal structure of the object. Many of these are not easy to perform correction. Therefore, it is important to use light which is robust against aberrations in order to perform image acquisition or processing with good quality. The multi-ring mask of the present embodiment can generate the light with high robustness.

In the above description, the center position is included in the innermost transmitting area in the multi-ring mask of the present embodiment. However, it is not limited thereto, and in the multi-ring mask of the present embodiment, the center position may be included in the light-shielding area as illustrated in FIG. 18. FIG. 18 includes diagrams illustrating configurations of modifications of the multi-ring mask in the present embodiment. (a) in FIG. 18 illustrates a configuration including a small light-shielding area near the center position in the double-ring mask including two ring-shaped light-shielding areas. (b) in FIG. 18 illustrates a configuration including a small light-shielding area near the center position in the triple-ring mask including three ring-shaped light-shielding areas.

Figure 19:
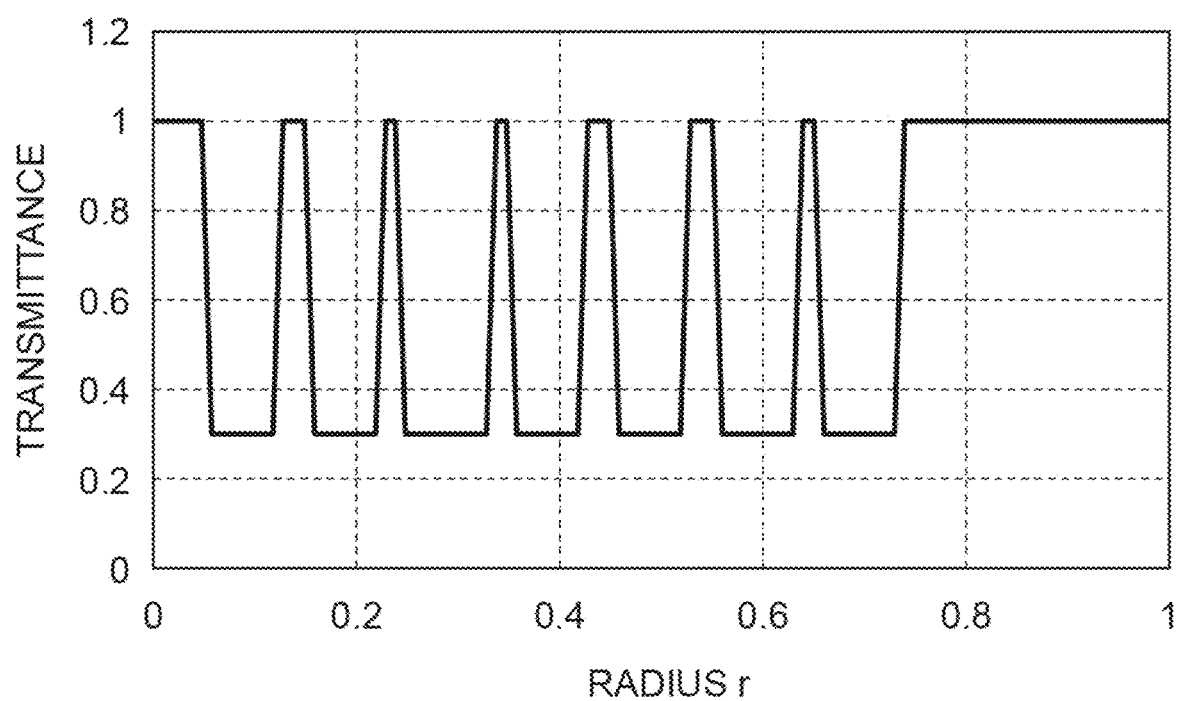
FIG. 19 is a diagram showing an example of a light transmittance distribution in a septuple-ring mask of the present embodiment.

In the above description, it is assumed that the light transmittance in the transmitting area is 1, and the light transmittance in the light-shielding area is 0. However, it is not limited thereto, and in the multi-ring mask of the present embodiment, the light transmittance in the transmitting area may be smaller than 1, or the light transmittance in the light-shielding area may be larger than 0. FIG. 19 is a diagram showing an example of the light transmittance distribution in the septuple-ring mask of the present embodiment. In this example, the light transmittance in the transmitting area is set to 1, and the light transmittance in the light-shielding area is set to 0.3.

It is preferable to switch the pattern of the multi-ring mask, when changing to a focusing lens having a different magnification or NA, or when changing an intensity distribution of input light to the multi-ring mask by changing a magnification of a beam expander or an imaging system in a microscope. Further, when a laser light source in which a wavelength of output light is variable is used, a light intensity distribution may be changed by changing the wavelength, and in this case also, it is preferable to switch the pattern of the multi-ring mask. In these cases, when the multi-ring mask is constituted using the SLM, it is possible to easily and quickly switch the pattern of the multi-ring mask.

The multi-ring mask may use light passing through the transmitting area in input light by one flat plate shape, but may be configured to include the light-shielding area and the transmitting area by efficiently using light by shaping the light by a configuration as described below with reference to FIG. 20 and FIG. 21.

FIG. 20 includes diagrams illustrating examples of a pattern of a toroidal lens and a ring pattern projected by the pattern. (a) in FIG. 20 illustrates a phase pattern of the toroidal lens for focusing the light into a single ring-shaped region at a designed focal position. (b) in FIG. 20 illustrates a pattern of a single ring projected onto the focal position by the toroidal lens having the above phase pattern ((a) in FIG. 20). (c) in FIG. 20 illustrates a phase pattern of the toroidal lens for focusing the light into double ring-shaped regions at a designed focal position. (d) in FIG. 20 illustrates a pattern of a double ring projected onto the focal position by the toroidal lens having the above phase pattern ((c) in FIG. 20).

The pattern of (c) in FIG. 20 is suitable for generating fine lines, but cannot provide wide focusing. However, when the annular mask pattern as illustrated in (c) in FIG. 20 is designed using ray tracing, a position and a width of the light can be controlled.

Figure 21:
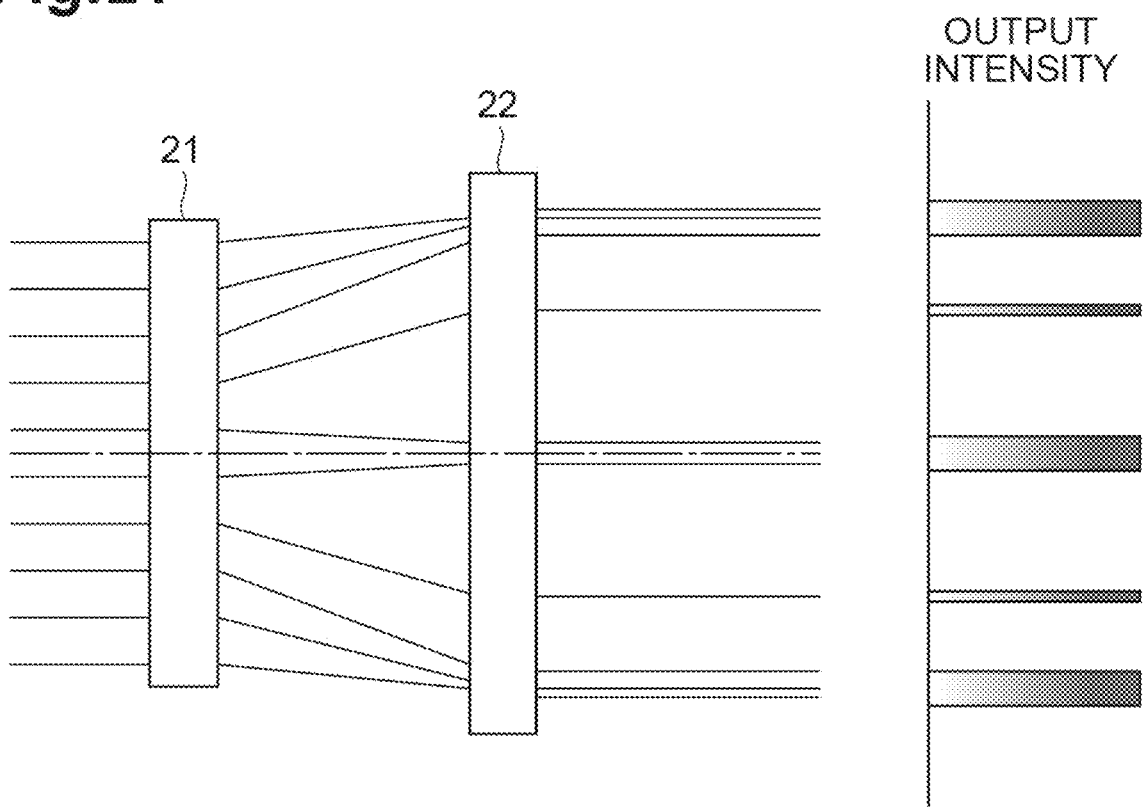
FIG. 21 is a diagram illustrating a configuration of the multi-ring mask including light-shielding areas and transmitting areas according to the pattern of the toroidal lens.

FIG. 21 is a diagram illustrating a configuration of the multi-ring mask including the light-shielding areas and the transmitting areas according to the pattern of the toroidal lens. In the configuration illustrated in this diagram, the multi-ring mask includes an amplitude modulation element 21 and a phase modulation element 22, and light having a light intensity distribution as illustrated in a right side of the diagram can be output from the phase modulation element 22. Each of the amplitude modulation element 21 and the phase modulation element 22 may be an SLM.

Light output from the laser light source and having an expanded beam diameter is input to the amplitude modulation element 21 on which the phase pattern as illustrated in (c) in FIG. 20 is presented, spatially amplitude-modulated by the amplitude modulation element 21, and then input to the phase modulation element 22. With respect to the light input to the amplitude modulation element 21, light output from the amplitude modulation element 21 may propagate in a different direction due to diffraction or refraction. As the light propagates from the amplitude modulation element 21 to the phase modulation element 22, the light intensity distribution in the beam cross-section changes.

The phase modulation element 22 is disposed at a position where a desired light intensity distribution (pattern as illustrated in (d) in FIG. 20) is obtained. With respect to the light input to the phase modulation element 22, light output from the phase modulation element 22 may propagate in a different direction due to diffraction or refraction. The light output from the phase modulation element 22 travels in a direction parallel to the optical axis. The light intensity distribution in the beam cross-section of the light output from the phase modulation element 22 becomes the desired light intensity distribution (pattern as illustrated in (d) in FIG. 20).

The phase modulation element 22 may set the output light as converging light or may set the output light as diverging light, in addition to setting the output light as parallel light. Further, the phase modulation element 22 may be a phase pattern for converging the output light to multiple points, or may be a phase pattern for correcting aberration.

Further, as described with reference to FIG. 22, the multi-ring mask of the present embodiment may have a configuration in which a plurality of masks each including one or a plurality of ring-shaped light-shielding areas provided around the center position are stacked. FIG. 22 includes diagrams illustrating a configuration example of the multi-ring mask in which the plurality of masks are stacked. The triple-ring mask illustrated in FIG. 3 can be configured by stacking four masks of (a) to (d) in FIG. 22 while matching the center position.

In the above description, the boundary between the light-shielding area and the transmitting area in the multi-ring mask of the present embodiment is set to a circle, and further, the boundary may be set to an ellipse. For example, a shape in the beam cross-section of the light output from a laser diode is an ellipse, and accordingly, it is preferable that the boundary between the light-shielding area and the transmitting area in the multi-ring mask is set to an ellipse.

Figure 23:
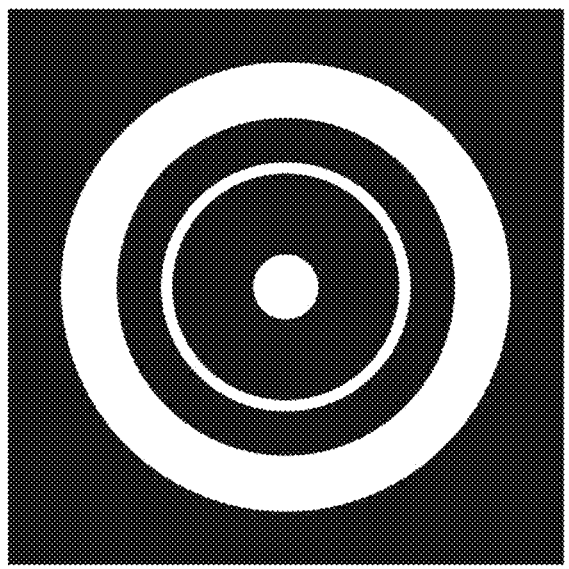
FIG. 23 is a diagram illustrating an example of a pattern of a double-ring mask suitable for generating fluorescence by a three-photon absorption process.

In the above, the pattern of the multi-ring mask suitable for generating fluorescence through the two-photon absorption process by irradiating the surface or the inside of the object with the excitation light has been described. However, it is not limited thereto, and the multi-ring mask of the present embodiment may have a pattern of the multi-ring mask suitable for generating fluorescence through a three-photon absorption process. FIG. 23 is a diagram illustrating an example of a pattern of the double-ring mask suitable for generating fluorescence by the three-photon absorption process.

Next, an embodiment of an optical microscope will be described. FIG. 24 to FIG. 28 illustrate configuration examples of the optical microscope. Each of these optical microscopes includes the light irradiation apparatus 1 (FIG. 1) including the multi-ring mask of the present embodiment and for focusing the light on the surface or the inside of the object 2 to irradiate the object, and a photodetection apparatus for detecting light generated in the object 2 in response to light irradiation on the object 2 by the light irradiation apparatus 1. The light generated in the object 2 may be reflected light or scattered light having the same wavelength as the wavelength of the irradiation light, or may be fluorescence or Raman scattered light having a wavelength different from the wavelength of the irradiation light.

Figure 24:
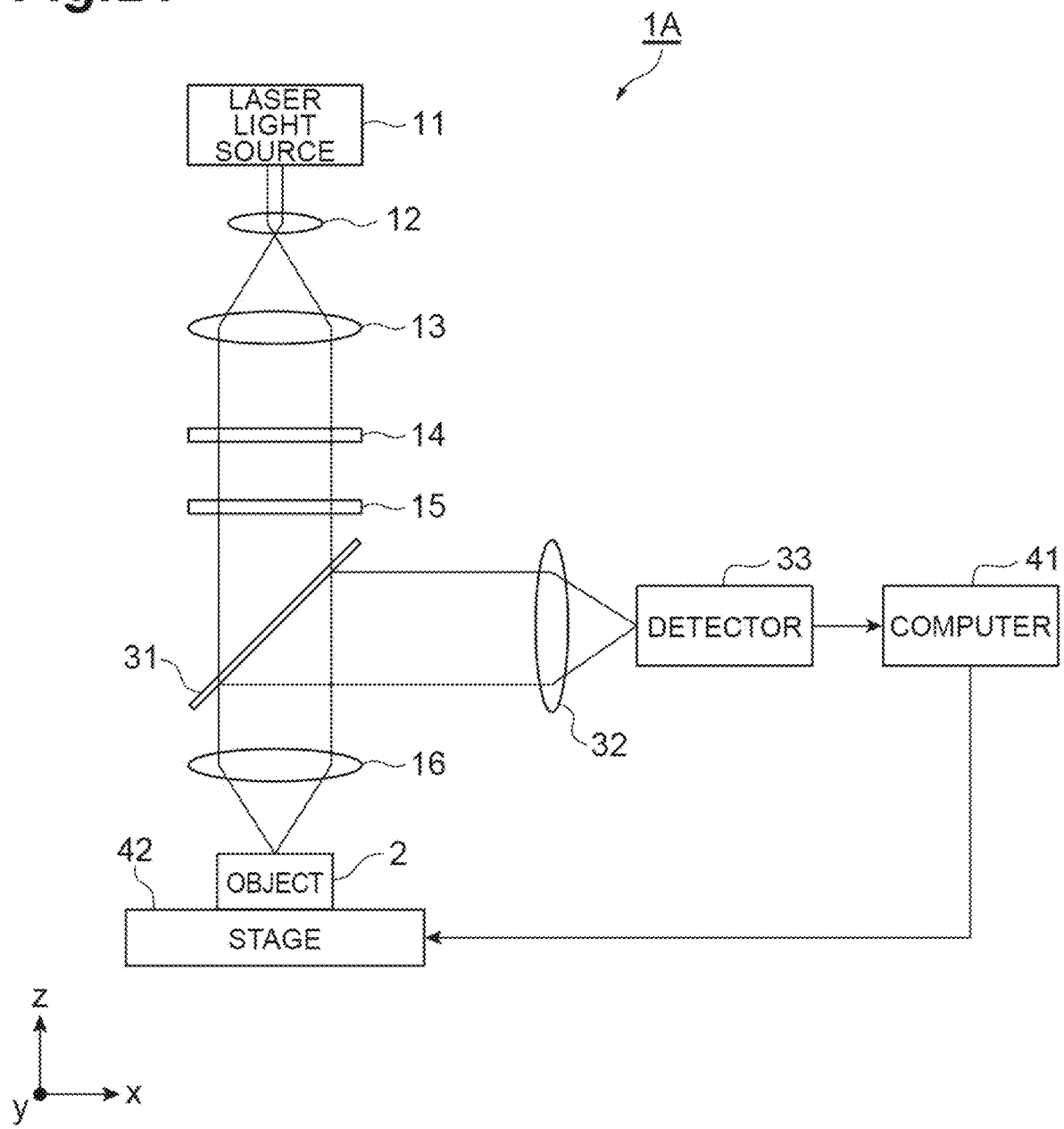
FIG. 24 is a diagram illustrating a configuration of an optical microscope 1A.

FIG. 24 is a diagram illustrating a configuration of an optical microscope 1A. The optical microscope 1A includes the laser light source 11, the lens 12, the lens 13, the mask 14, the wave plate 15, and the objective lens 16. These components constitute the light irradiation apparatus (FIG. 1) for focusing and applying the excitation light on the surface or the inside of the object 2.

The excitation light output from the laser light source 11 is expanded in beam diameter and collimated by the lenses 12 and 13, and spatially intensity-modulated in the beam cross-section and output by the mask 14. The polarization of the excitation light output from the mask 14 is controlled by the wave plate 15, and then the light is focused on the surface or the inside of the object 2 by the objective lens 16.

Further, the optical microscope 1A includes a dichroic mirror 31, a lens 32, and a photodetector 33. These components constitute the photodetection apparatus for detecting the fluorescence generated in the object 2 in response to the excitation light irradiation on the object 2 by the light irradiation apparatus.

The dichroic mirror 31 is provided on an optical path between the wave plate 15 and the objective lens 16. The dichroic mirror 31 transmits the excitation light output from the laser light source 11 and arriving through the lens 12, the lens 13, the mask 14, and the wave plate 15, and outputs the excitation light to the objective lens 16. When the excitation light is focused and applied to the surface or the inside of the object 2 from the objective lens 16, the fluorescence is generated at the focusing position. The dichroic mirror 31 reflects the fluorescence arriving from the object 2 through the objective lens 16, and outputs the fluorescence to the lens 32. The dichroic mirror 31 may be provided on an optical path between the mask 14 and the wave plate 15. The lens 32 focuses the fluorescence arriving from the dichroic mirror 31 on a light receiving surface of the photodetector 33. The photodetector 33 detects the fluorescence generated in the object 2 in response to the excitation light irradiation on the object 2.

The photodetector 33 may be a photomultiplier tube, or may be a photodiode. Further, a filter for selectively transmitting the fluorescence may be provided before the light receiving surface of the photodetector 33.

Further, the optical microscope 1A includes a computer 41 and a stage 42. The computer 41 inputs data of fluorescence detection results from the photodetector 33. The object 2 is placed on the stage 42. When an xyz orthogonal coordinate system having a z-axis parallel to the incident direction of the excitation light is set as illustrated in the diagram, the stage 42 can move the object 2 in the z-direction, and can also move the object 2 in the x-direction and the y-direction.

In addition to or instead of the stage 42, a scanning unit (for example, a galvano scanner) for scanning the excitation light focusing position in the x-direction and the y-direction may be provided, or an actuator (for example, a piezo actuator) for moving the objective lens 16 in the z-direction may be provided.

The computer 41 scans the focusing position of the excitation light in the object 2 by driving the stage 42, and inputs the data of the fluorescence detection results by the photodetector 33 when the excitation light focusing position is set to each position in the object 2 by the scanning Thus, the computer 41 can acquire a three-dimensional fluorescence image of the object 2.

The optical microscope 1A uses the multi-ring mask of the present embodiment as the mask 14, and thus, it is possible to realize a smaller PSF, and suppress the occurrence of the side lobe and the second lobe, and therefore, it is possible to acquire a three-dimensional fluorescence image having higher spatial resolution. Further, the optical microscope 1A can acquire the three-dimensional fluorescence image having higher spatial resolution by using the multi-ring mask having a pattern suitable for generating the fluorescence through the multi-photon absorption process as the mask 14.

Figure 25:
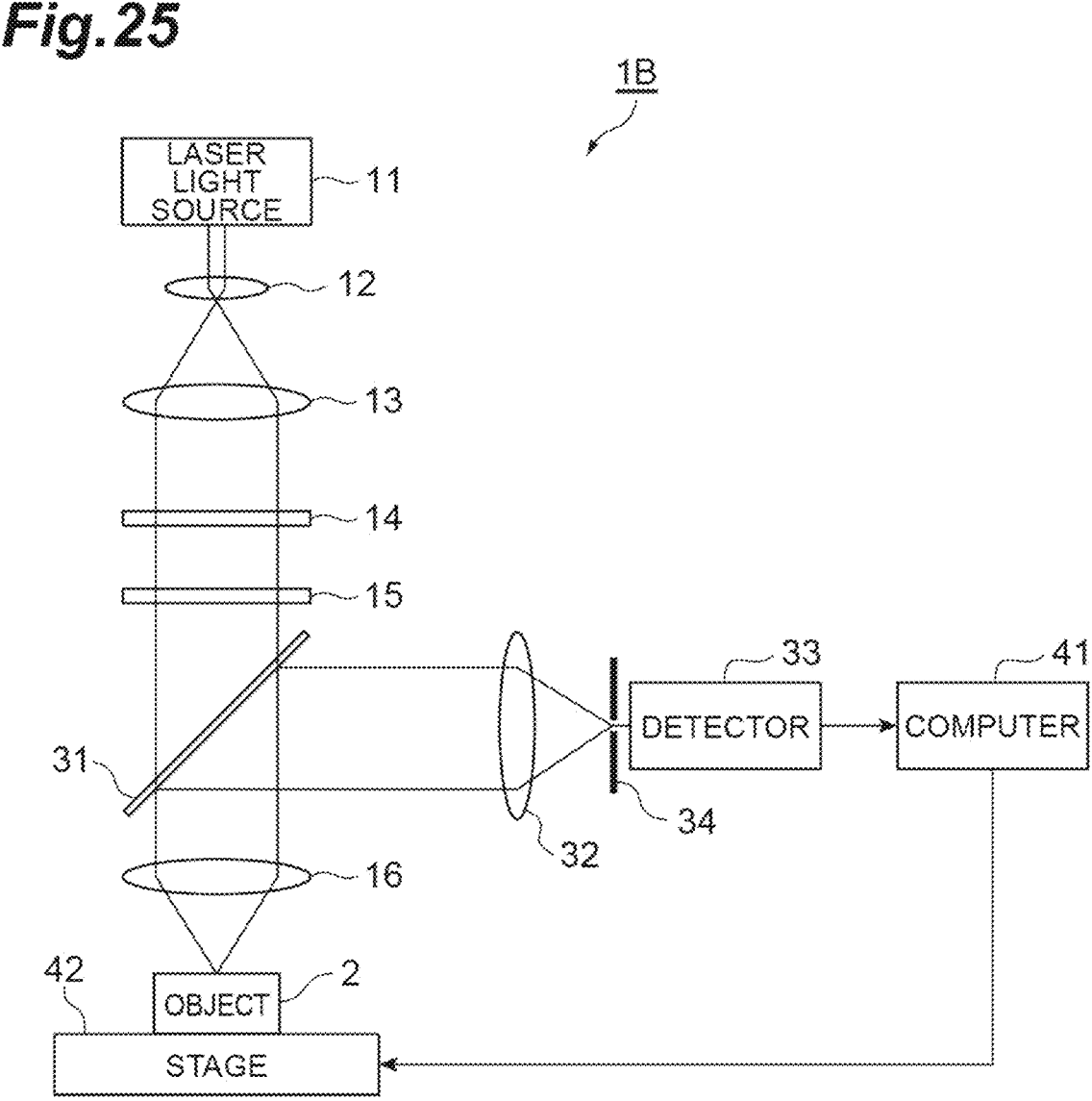
FIG. 25 is a diagram illustrating a configuration of an optical microscope 1B.

FIG. 25 is a diagram illustrating a configuration of an optical microscope 1B. As compared with the configuration of the optical microscope 1A (FIG. 24), the configuration of the optical microscope 1B (FIG. 25) is different in that a pinhole plate 34 is provided between the lens 32 and the photodetector 33 in the photodetection apparatus. The pinhole plate 34 has an aperture of a small diameter through which the light passes. The aperture of the pinhole plate 34 is disposed at a position conjugate to the focusing position of the excitation light by the light irradiation apparatus. The photodetector 33 receives the fluorescence which has passed through the aperture of the pinhole plate 34 in the fluorescence generated in the object 2.

The optical microscope 1B has a configuration of a confocal fluorescence microscope. The optical microscope 1B uses the multi-ring mask of the present embodiment as the mask 14, and thus, it is possible to realize a smaller PSF, and suppress the occurrence of the side lobe and the second lobe, and therefore, it is possible to acquire a three-dimensional fluorescence image having higher spatial resolution. The optical microscope 1B may use the multi-ring mask having a pattern suitable for generating the fluorescence through the multi-photon absorption process as the mask 14.

Figure 26:
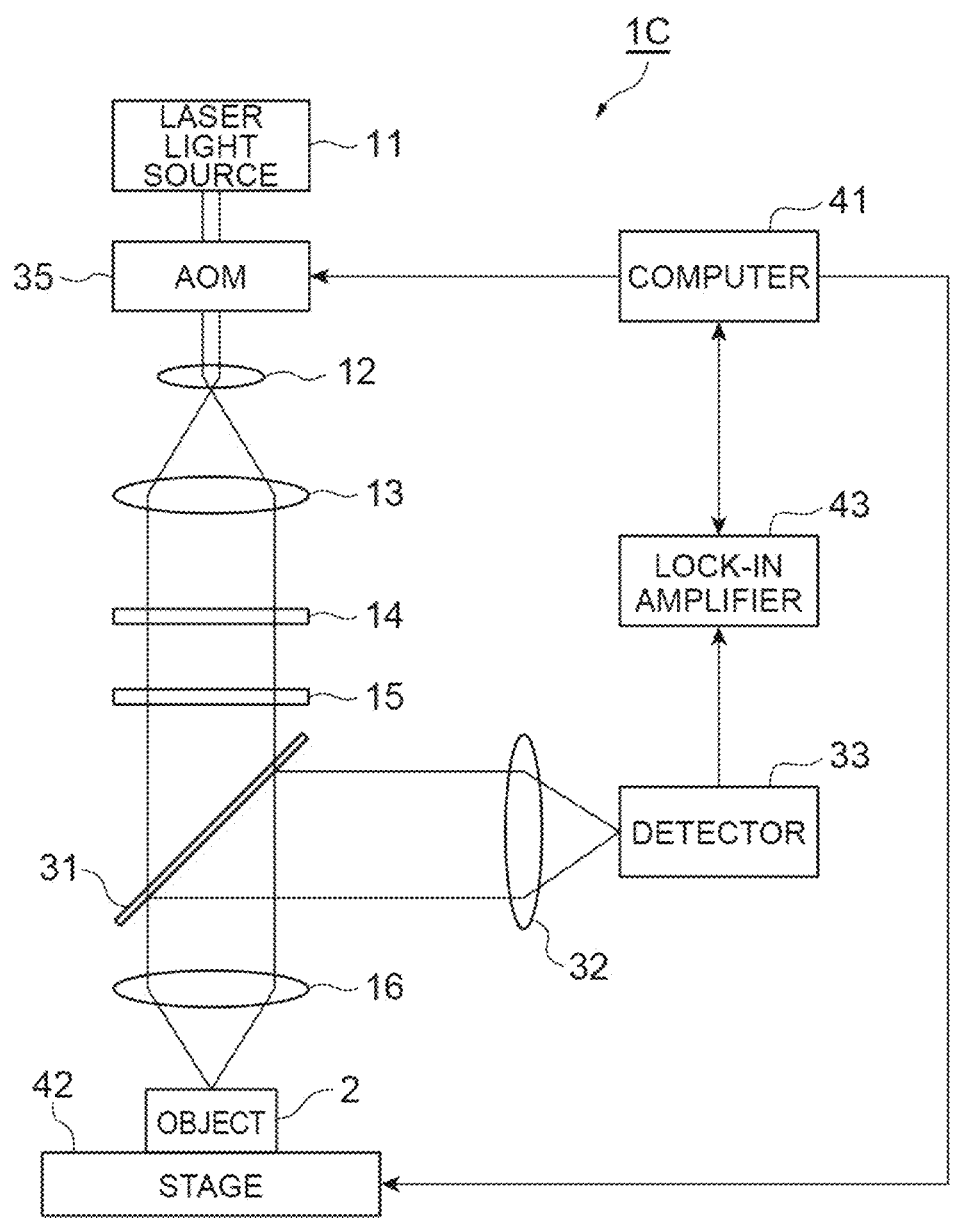
FIG. 26 is a diagram illustrating a configuration of an optical microscope 1C.

FIG. 26 is a diagram illustrating a configuration of an optical microscope 1C. As compared with the configuration of the optical microscope 1A (FIG. 24), the configuration of the optical microscope 1C (FIG. 26) is different in that an acousto-optic modulator (AOM) 35 is provided between the laser light source 11 and the lens 12 in the light irradiation apparatus, and different in that a lock-in amplifier 43 for inputting the output signal from the photodetector 33 is provided in the photodetection apparatus.

The AOM 35 is a modulation unit for temporally modulating the intensity of the excitation light irradiation on the object 2. The AOM 35 sinusoidally modulates the intensity of the excitation light irradiation at a modulation frequency co instructed from the computer 41. Thus, the intensity of the excitation light with which the object 2 is irradiated is sinusoidally changed with time.

The lock-in amplifier 43 inputs the fluorescence intensity signal indicating a temporal change of the fluorescence intensity detected by the photodetector 33, and further, inputs a reference signal having a frequency equal to or an integer multiple of the modulation frequency ω of the AOM 35 from the computer 41. Further, the lock-in amplifier 43 selectively detects a component of a frequency nω being n times the modulation frequency ω in the input fluorescence intensity signal, and outputs it to the computer 41. n is a positive integer. When it is set to n=1, the lock-in amplifier 43 selectively detects and outputs a fundamental component of the frequency ω in the fluorescence intensity signal. When it is set to n≥2, the lock-in amplifier 43 selectively detects and outputs an n-th harmonic component in the fluorescence intensity signal.

When it is set to n≥2, the optical microscope 1C has a configuration of a saturated excitation (SAX) microscope. The SAX microscope makes use of the following phenomenon. When the intensity of the excitation light with which the object is irradiated is small, the intensity of the fluorescence generated in the object by the irradiation of the excitation light is proportional to the excitation light intensity. However, as the excitation light intensity increases, the fluorescence intensity saturates and becomes a non-linear relation with respect to the excitation light intensity. Therefore, when the object is irradiated with the excitation light of high intensity temporally modulated at the modulation frequency co, a temporal change of the intensity of the fluorescence generated in the object includes the fundamental component of the frequency co, and in addition, includes the n-th harmonic component being a non-linear component. The excitation light intensity increases as the position is closer to the center position in the excitation light focusing region, and thus, the n-th harmonic component in the fluorescence intensity signal represents the intensity of the fluorescence generated near the center position in the excitation light focusing region.

The optical microscope 1C as the SAX microscope uses the above phenomenon, and can acquire a three-dimensional fluorescence image having higher spatial resolution. Further, the optical microscope 1C can acquire the three-dimensional fluorescence image having higher spatial resolution by using the multi-ring mask of the present embodiment (in particular, the multi-ring mask having a pattern suitable for generating the fluorescence through the multi-photon absorption process) as the mask 14.

Figure 27:
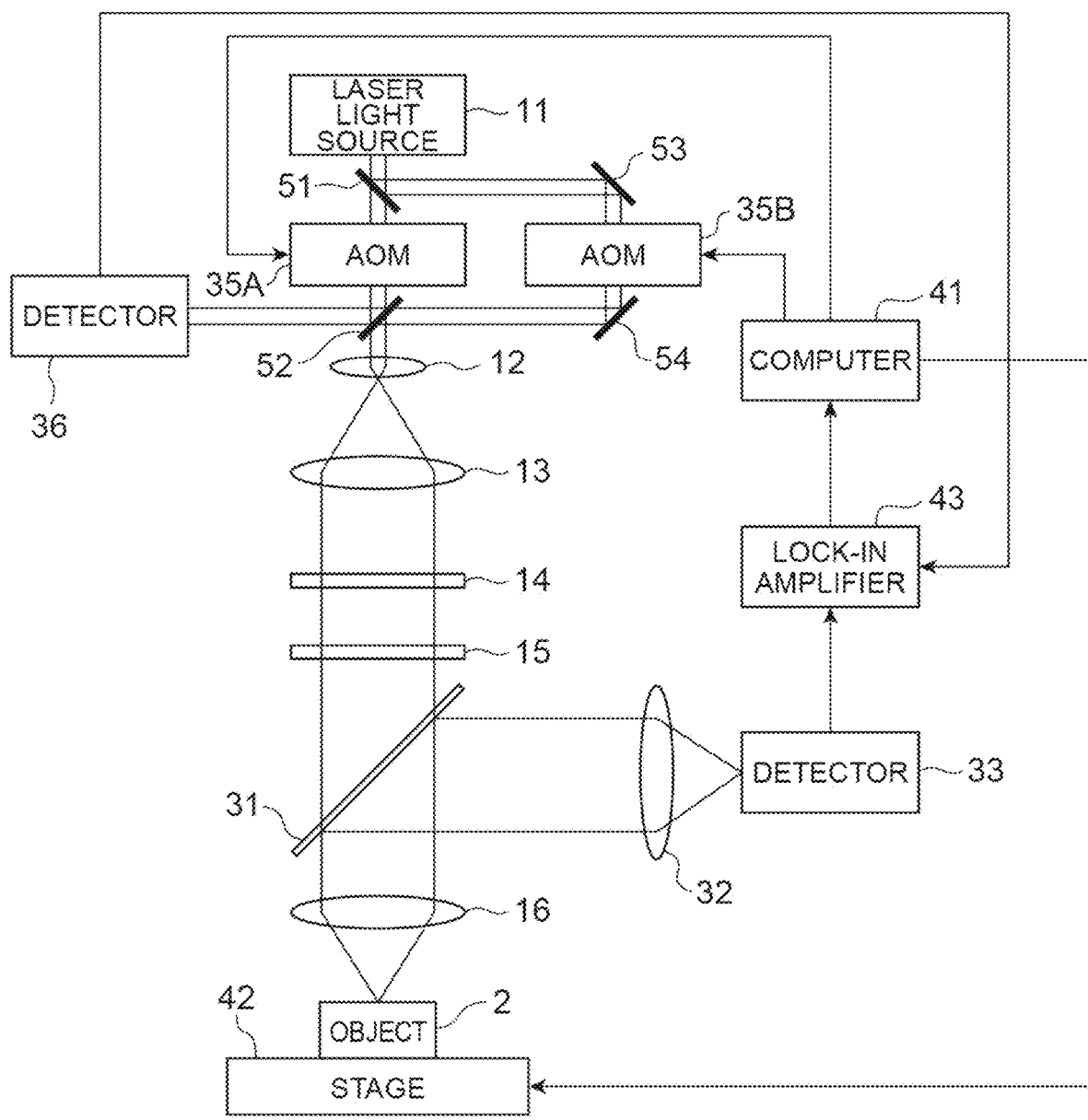
FIG. 27 is a diagram illustrating a configuration of an optical microscope 1D.

FIG. 27 is a diagram illustrating a configuration of an optical microscope 1D. As compared with the configuration of the optical microscope 1C (FIG. 26), the configuration of the optical microscope 1D (FIG. 27) is different in that an AOM 35A, an AOM 35B, and the like are provided as the modulation unit for temporally modulating the intensity of the excitation light irradiation on the object 2, different in that a photodetector 36 is further provided, and different in that a reference signal having the same frequency as the modulation frequency of the excitation light is provided from the photodetector 36 to the lock-in amplifier 43.

The modulation unit for temporally modulating the intensity of the irradiation of the excitation light on the object 2 includes a beam splitter 51, a beam splitter 52, a mirror 53, and a mirror 54, in addition to the AOM 35A and the AOM 35B. These components are provided on an optical path of the excitation light between the laser light source 11 and the lens 12.

The beam splitter 51 splits the excitation light output from the laser light source 11 into two light beams to form first split light and second split light. The first split light output from the beam splitter 51 is input to the beam splitter 52 through the AOM 35A. The second split light output from the beam splitter 51 is input to the beam splitter 52 through the mirror 53, the AOM 35B, and the mirror 54. The beam splitter 52 inputs the first split light arrived from the AOM 35A, inputs the second split light arrived from the mirror 54, and splits the first split light and the second split light into two light beams to output the excitation light caused by interference between the first split light and the second split light to both the lens 12 and the photodetector 36.

The AOMs 35A and 35B sinusoidally modulate the waveform of the excitation light at the modulation frequencies different from each other instructed from the computer 41. Thus, the intensity of the excitation light output from the beam splitter 52 to each of the lens 12 and the photodetector 36 changes sinusoidally with time. The modulation frequency ω of the excitation light output from the beam splitter 52 is according to the difference between the modulation frequencies different from each other instructed to the AOMs 35A and 35B from the computer 41. The excitation light output from the beam splitter 52 to the lens 12 is focused and applied to the surface or the inside of the object 2.

The photodetector 36 receives the excitation light output from the beam splitter 52, and outputs the reference signal having the same frequency as the modulation frequency ω of the excitation light to the lock-in amplifier 43. The lock-in amplifier 43 inputs the fluorescence intensity signal indicating the temporal change of the fluorescence intensity detected by the photodetector 33, and further, inputs the reference signal of the modulation frequency ω output from the photodetector 36. Further, the lock-in amplifier 43 selectively detects the component of the frequency nω being n times the modulation frequency ω in the input fluorescence intensity signal, and outputs it to the computer 41. n is a positive integer. When it is set to n=1, the lock-in amplifier 43 selectively detects and outputs the fundamental component of the frequency ω in the fluorescence intensity signal. When it is set to n≥2, the lock-in amplifier 43 selectively detects and outputs the n-th harmonic component in the fluorescence intensity signal.

The optical microscope 1D has the same function and effect as the optical microscope 1C, and when it is set to n≥2, it has the configuration of the SAX microscope as the optical microscope 1C, and therefore, a three-dimensional fluorescence image having higher spatial resolution can be acquired.

Figure 28:
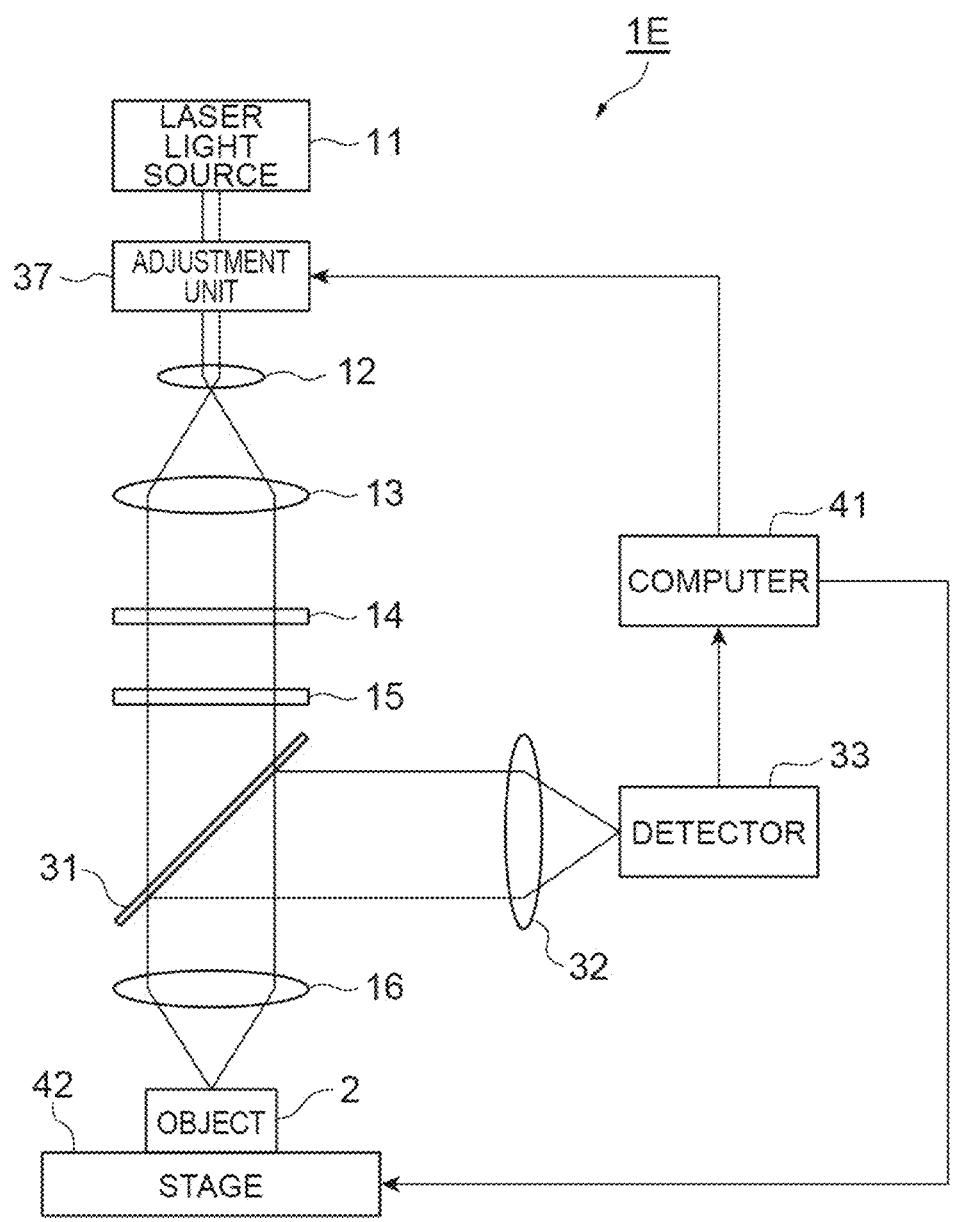
FIG. 28 is a diagram illustrating a configuration of an optical microscope 1E.

FIG. 28 is a diagram illustrating a configuration of an optical microscope 1E. As compared with the configuration of the optical microscope 1A (FIG. 24), the configuration of the optical microscope 1E (FIG. 28) is different in that an adjustment unit 37 is provided between the laser light source 11 and the lens 12, in the light irradiation apparatus.

The adjustment unit 37 is a unit for adjusting the intensity of the excitation light irradiation on the object 2. The adjustment unit 37 may be an optical component having a variable transmittance (for example, an acousto-optic element, an ND filter, a liquid crystal cell, or the like), or may be configured by a combination of two or more optical components (for example, a wave plate and a polarizer). In the case where the adjustment unit 37 is constituted by the wave plate and the polarizer, the intensity of the excitation light irradiation on the object 2 can be adjusted by changing an orientation of an optic axis of the wave plate or the polarizer. Further, the adjustment unit may be integrally provided with the laser light source 11, and for example, the intensity of the excitation light output from the laser light source 11 may be adjusted by changing a drive current supplied to the laser light source 11.

The computer 41 sets the intensity of the excitation light output from the adjustment unit 37 and with which the object 2 is irradiated to each of a plurality of values, and inputs the fluorescence intensity signal indicating the fluorescence intensity detected by the photodetector 33. Further, the computer 41 obtains a non-linear component included in the light generated in the object 2 based on the intensity of the fluorescence generated in the object 2 when the intensity of the excitation light irradiation on the object 2 is set to each of the plurality of values by the adjustment unit 37.

Specifically, when the fluorescence is generated through the two-photon absorption process of the excitation light, the non-linear component included in the fluorescence may be obtained as follows. The intensity of the excitation light with which the object 2 is irradiated is set to $I_{ex\_L}$ by the adjustment unit 37, and the fluorescence intensity detected by the photodetector 33 in this case is set to $I_L$. $I_{ex\_L}$ is the excitation light intensity in a range in which the fluorescence intensity is proportional to the excitation light intensity. Further, the intensity of the excitation light with which the object 2 is irradiated is set to $I_{ex\_H}$ by the adjustment unit 37, and the fluorescence intensity detected by the photodetector 33 in this case is set to $I_H$. $I_{ex\_H}$ is the excitation light intensity in a range in which the fluorescence intensity is saturated and becomes the non-linear relation with respect to the excitation light intensity. Further, the non-linear component $I_{SAX}$ included in the fluorescence intensity in the case where the intensity of the excitation light with which the object 2 is irradiated is set to $I_{ex\_H}$ is obtained by the following Formula.

[Formula 5]

$$I_{SAX} = \left(\frac{I_{ex\_H}}{I_{ex\_L}}\right)^2 I_L - I_H \quad (5)$$

The above optical microscope 1E is similar to the optical microscope 1C and the optical microscope 1D in that the non-linear component included in the fluorescence intensity in the case where the intensity of the excitation light with which the object 2 is irradiated is set to a large value is obtained. Therefore, the optical microscope 1E can acquire a three-dimensional fluorescence image having higher spatial resolution similarly to the optical microscope 1C and the optical microscope 1D.

In the optical microscopes 1A to 1E described above, the excitation light output from the laser light source 11 may be continuous light, or may be pulsed light. In the case where the fluorescence generated through the multi-photon absorption process in the object 2 is to be detected, the excitation light is preferably the pulsed light. Further, in the case where the excitation light is the pulsed light, it is preferable that a filter provided between the photodetector 33 and the lock-in amplifier 43 selectively blocks a repetition frequency component of the excitation light pulse and a harmonic component thereof in the fluorescence intensity signal output from the photodetector 33, and selectively transmits the fundamental component of the frequency ω and the n-th harmonic component of the frequency nω to be input to the lock-in amplifier 43.

The optical microscopes 1C to 1E, which are SAX microscopes, may have a configuration of a confocal fluorescence microscope similarly to the optical microscope 1B. That is, a pinhole plate having an aperture of a small diameter provided at a position being conjugate to the focusing position of the excitation light may be disposed in front of the light receiving surface of the photodetector 33, and the fluorescence passing through the aperture of the pinhole plate in the fluorescence generated in the object 2 may be received by the photodetector 33.

In the SAX microscope, when the intensity of the fundamental component of the fluorescence generated through the two-photon absorption process of the excitation light is set to $P_1$, the intensity of the second harmonic component is set to $P_2$, and the intensity of the third harmonic component is set to $P_3$, these components $P_1$ to $P_3$ indicate the intensities of the fluorescence mainly generated in the regions represented by the following Formula (6). $PSF^2$ corresponds to the PSF at the time of the two-photon absorption process, $PSF^4$ corresponds to the PSF at the time of the four-photon absorption process, and $PSF^6$ corresponds to the PSF at the time of the six-photon absorption process. The $PSF^4$ component can be obtained by detecting the third harmonic component. The $PSF^6$ component can be obtained by detecting the fundamental component, the second harmonic component, and the third harmonic component, and by using the following Formula (7).

[Formula 6]

$$P_1: 2PSF^2 - \frac{7}{2}PSF^4 + \frac{33}{8}PSF^6 \quad (6a)$$

$$P_1: \frac{1}{2}PSF^2 - \frac{7}{4}PSF^4 + \frac{495}{192}PSF^6 \quad (6b)$$

$$P_3: \frac{1}{2}PSF^4 - \frac{55}{48}PSF^6 \quad (6c)$$

[Formula 7]

$$P_1 - 4P_2 - 7P_3 \quad (7)$$

Figure 29:
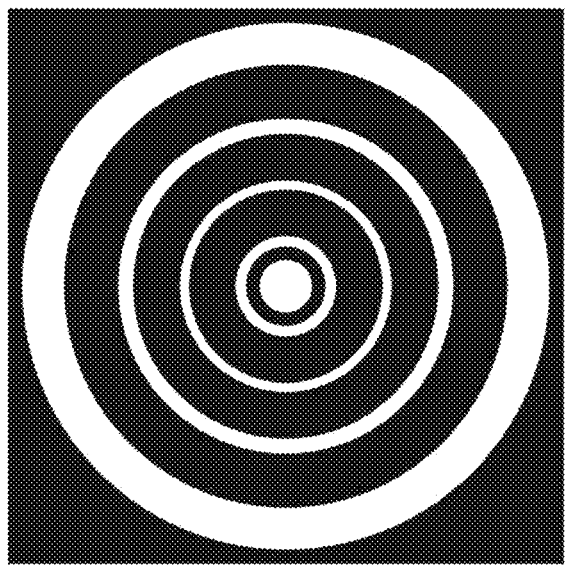
FIG. 29 is a diagram illustrating an example of a pattern of the multi-ring mask used at the time of $PSF^2$ observation in the optical microscopes 1C to 1E.
Figure 30:
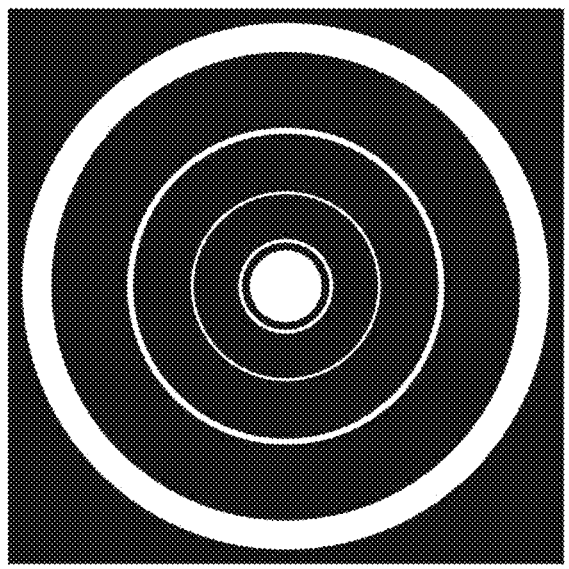
FIG. 30 is a diagram illustrating an example of a pattern of the multi-ring mask used at the time of $PSF^4$ observation in the optical microscopes 1C to 1E.
Figure 31:
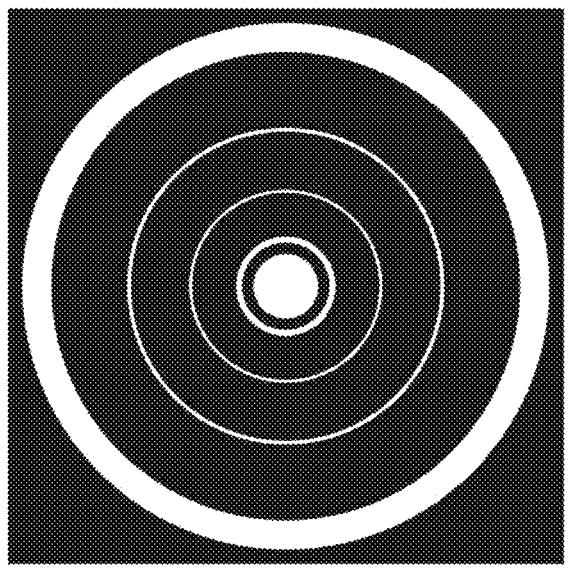
FIG. 31 is a diagram illustrating an example of a pattern of the multi-ring mask used at the time of $PSF^6$ observation in the optical microscopes 1C to 1E.

In each of the optical microscopes 1C to 1E being the SAX microscope, the $PSF^2$ observation, the $PSF^4$ observation, or the $PSF^6$ observation can be performed by appropriately designing the pattern of the multi-ring mask used as the mask 14. FIG. 29 is a diagram illustrating an example of the pattern of the multi-ring mask used at the time of the $PSF^2$ observation in the optical microscopes 1C to 1E. FIG. 30 is a diagram illustrating an example of the pattern of the multi-ring mask used at the time of the $PSF^4$ observation in the optical microscopes 1C to 1E. FIG. 31 is a diagram illustrating an example of the pattern of the multi-ring mask used at the time of the $PSF^6$ observation in the optical microscopes 1C to 1E.

Figure 32:
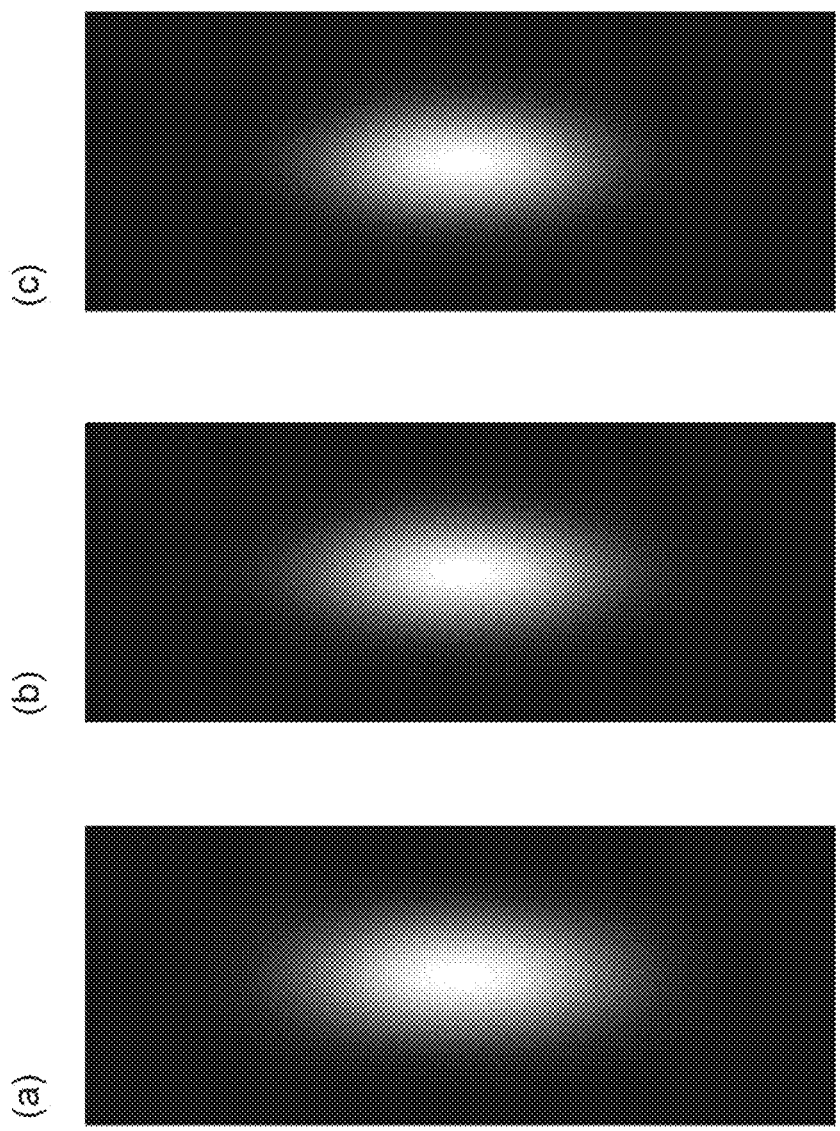
FIG. 32 includes (a)-(c) diagrams illustrating examples of the $PSF^2$ in the case of two-photon excitation.
Figure 33:
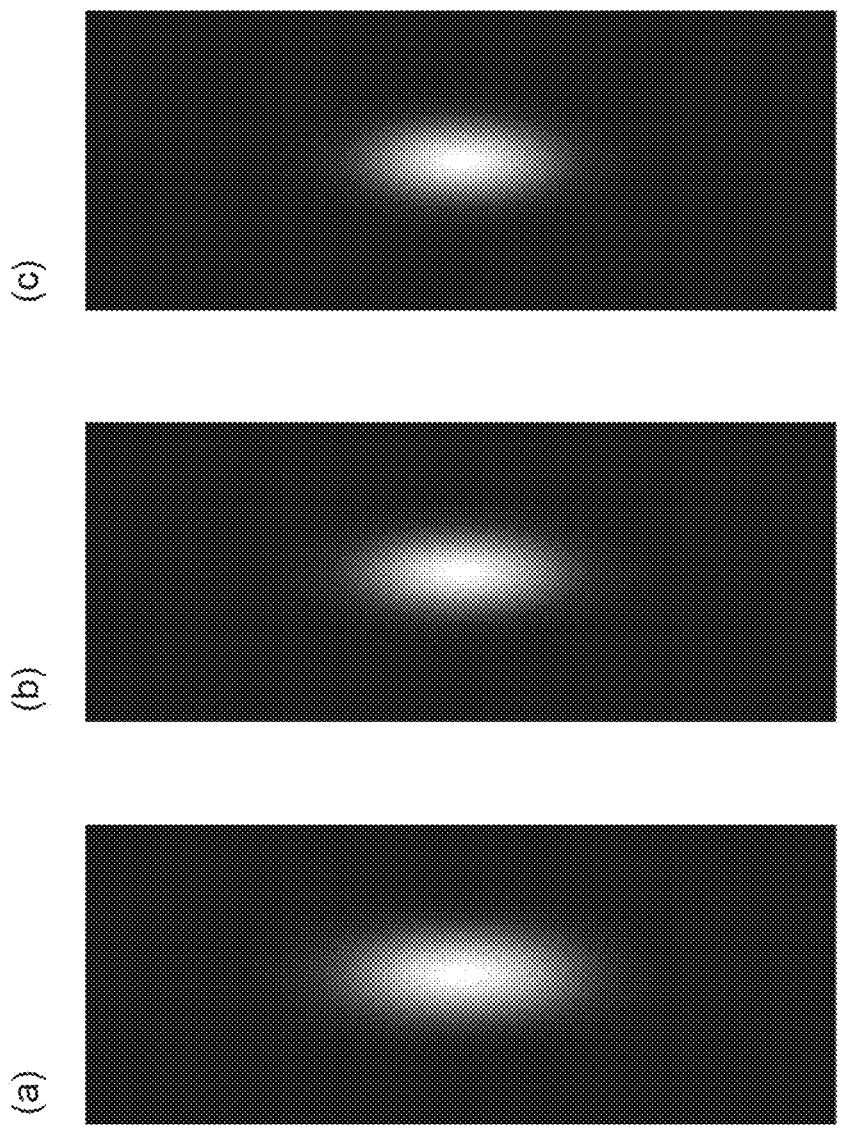
FIG. 33 includes (a)-(c) diagrams illustrating examples of the $PSF^4$ in the case of two-photon excitation.
Figure 34:
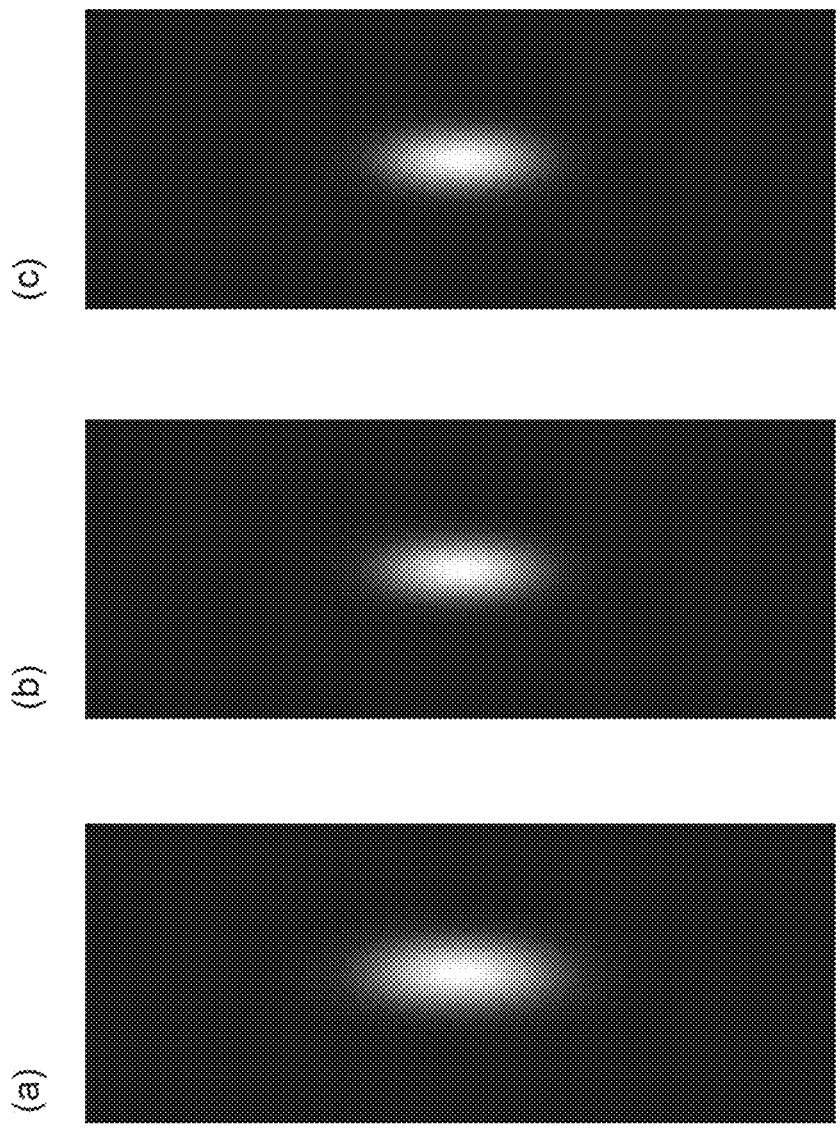
FIG. 34 includes (a)-(c) diagrams illustrating examples of the $PSF^6$ in the case of two-photon excitation.

FIG. 32 includes diagrams illustrating examples of the $PSF^2$ in the case of the two-photon excitation. (a) in FIG. 32 illustrates the $PSF^2$ when the mask is not used, (b) in FIG. 32 illustrates the $PSF^2$ when the single-ring mask is used, and (c) in FIG. 32 illustrates the $PSF^2$ when the octuple-ring mask is used. FIG. 33 includes diagrams illustrating examples of the $PSF^4$ in the case of the two-photon excitation. (a) in FIG. 33 illustrates the $PSF^4$ when the mask is not used, (b) in FIG. 33 illustrates the $PSF^4$ when the single-ring mask is used, and (c) in FIG. 33 illustrates the $PSF^4$ when the octuple-ring mask is used. FIG. 34 includes diagrams illustrating examples of the $PSF^6$ in the case of the two-photon excitation. (a) in FIG. 34 illustrates the $PSF^6$ when the mask is not used, (b) in FIG. 34 illustrates the $PSF^6$ when the single-ring mask is used, and (c) in FIG. 34 illustrates the $PSF^6$ when the octuple-ring mask is used.

FIG. 35 is a table showing the sizes of the PSF in various cases in the radial direction and the axial direction. In this table, the sizes (unit: nm) in the radial direction and the axial direction of the PSF in the case where the objective lens 16 having a magnification of 60 times, an NA of 1.3, and a working distance of 300 µm is used are shown. Further, in order from the left, the cases of the $PSF^2$ observation by the SAX microscope (without the mask), the $PSF^2$ observation by the SAX microscope (with the quadruple-ring mask), the $PSF^4$ observation by the SAX microscope (without the mask), the $PSF^4$ observation by the SAX microscope (with the quadruple-ring mask), the $PSF^6$ observation by the SAX microscope (without the mask), and the $PSF^6$ observation by the SAX microscope (with the quadruple-ring mask) are respectively shown.

As illustrated in FIG. 32 to FIG. 35, the $PSF^4$ is smaller than the $PSF^2$, and the $PSF^6$ is smaller than the $PSF^4$. Further, the $PSF^2$, the $PSF^4$, and the $PSF^6$ are smaller when the single-ring mask is used than when the mask is not used, and are smaller when the multi-ring mask is used than when the single-ring mask is used.

Figure 36:
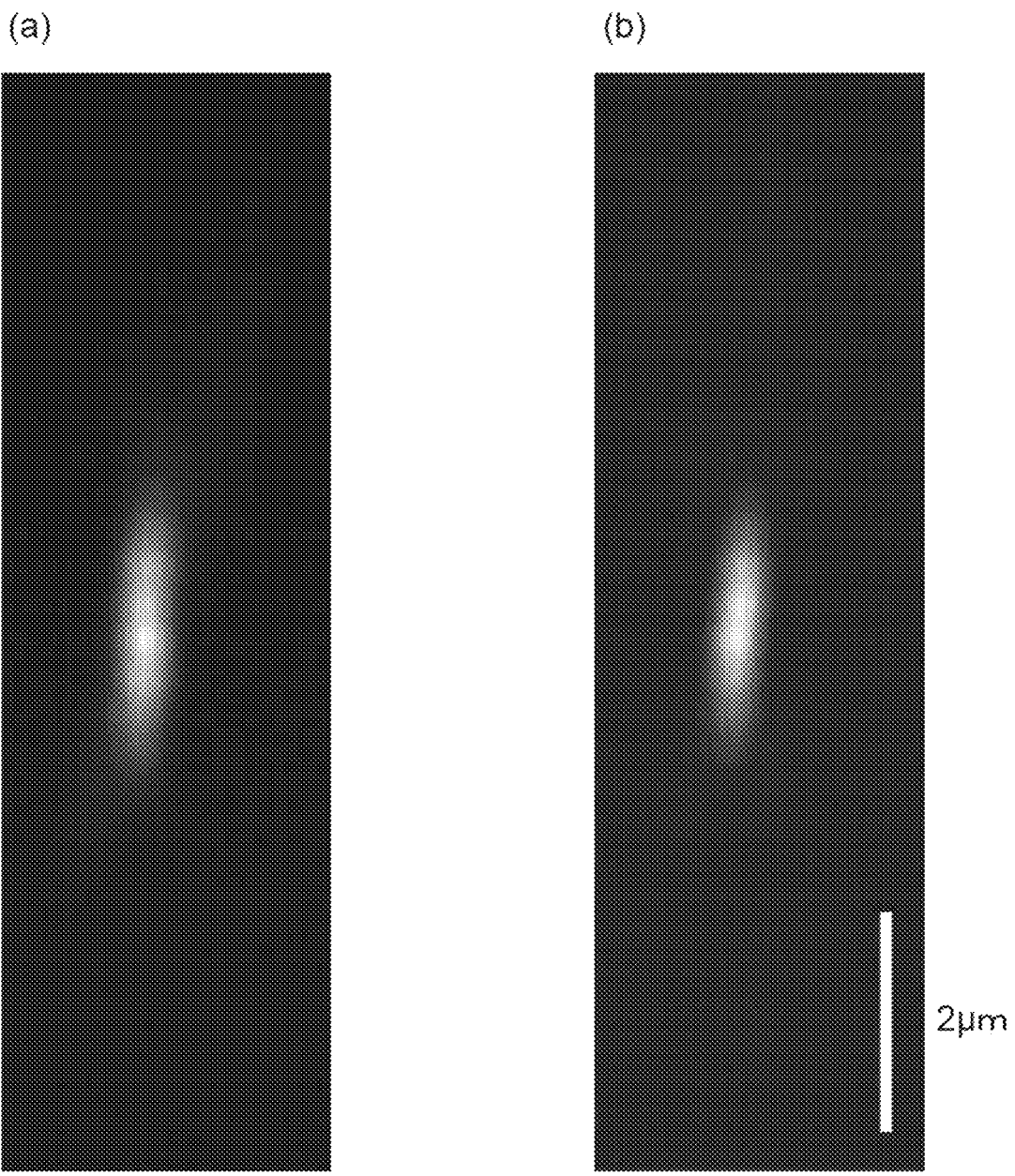
FIG. 36 includes (a), (b) diagrams illustrating light intensity distributions in a focusing region inside the object 2.

FIG. 36 includes diagrams illustrating the light intensity distributions in the focusing region inside the object 2. The observation object is an epoxy resin containing a plurality of fluorescent beads having a size of 0.2 µm. The light intensity distribution is observed by a two-photon excitation fluorescence microscope, and is on the xz plane. A silicone immersion objective lens having an NA of 1.05 is used. (a) in FIG. 36 illustrates the light intensity distribution observed in the case where the mask is not used, and (b) in FIG. 36 illustrates the light intensity distribution observed in the case where the sextuple-ring mask is used. As illustrated in the diagram, in the two-photon excitation fluorescence microscope, the focusing region can be reduced by using the multi-ring mask of the present embodiment.

Figure 37:
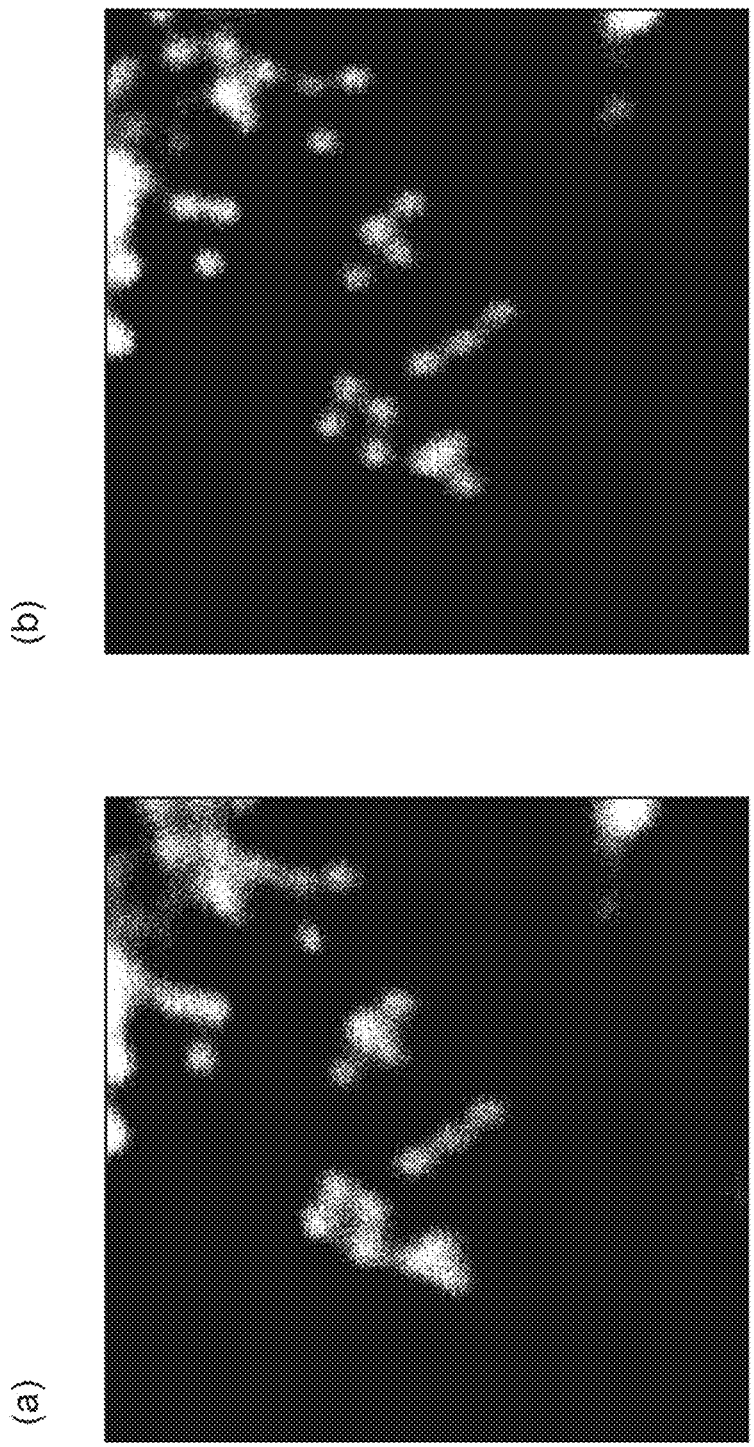
FIG. 37 includes (a), (b) diagrams illustrating examples of an image acquired by a two-photon excitation fluorescence microscope.

FIG. 37 includes diagrams illustrating examples of the image acquired by the two-photon excitation fluorescence microscope. The observation object is an epoxy resin containing a plurality of fluorescent beads having a size of 0.2 µm. (a) in FIG. 37 illustrates the image acquired in the case where the mask is not used, and (b) in FIG. 37 illustrates the image acquired in the case where the triple-ring mask is used. As illustrated in the diagram, in the two-photon excitation fluorescence microscope, it is possible to acquire a fluorescence image having high spatial resolution by using the multi-ring mask of the present embodiment.

Figure 38:
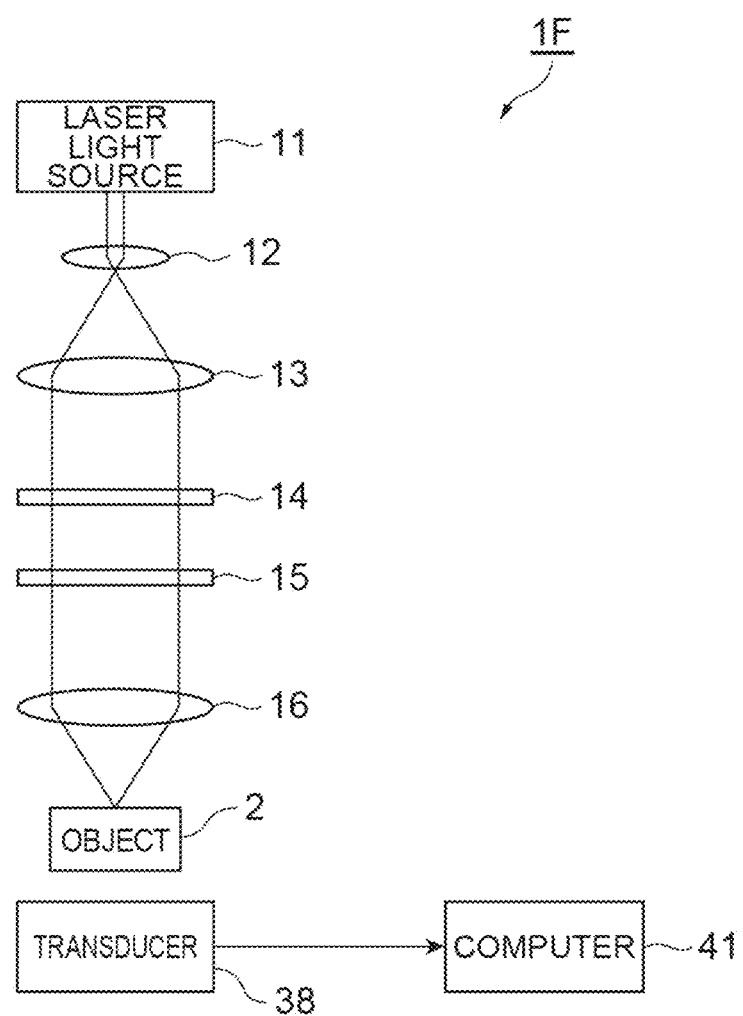
FIG. 38 is a diagram illustrating a configuration of a photoacoustic microscope 1F.
Figure 39:
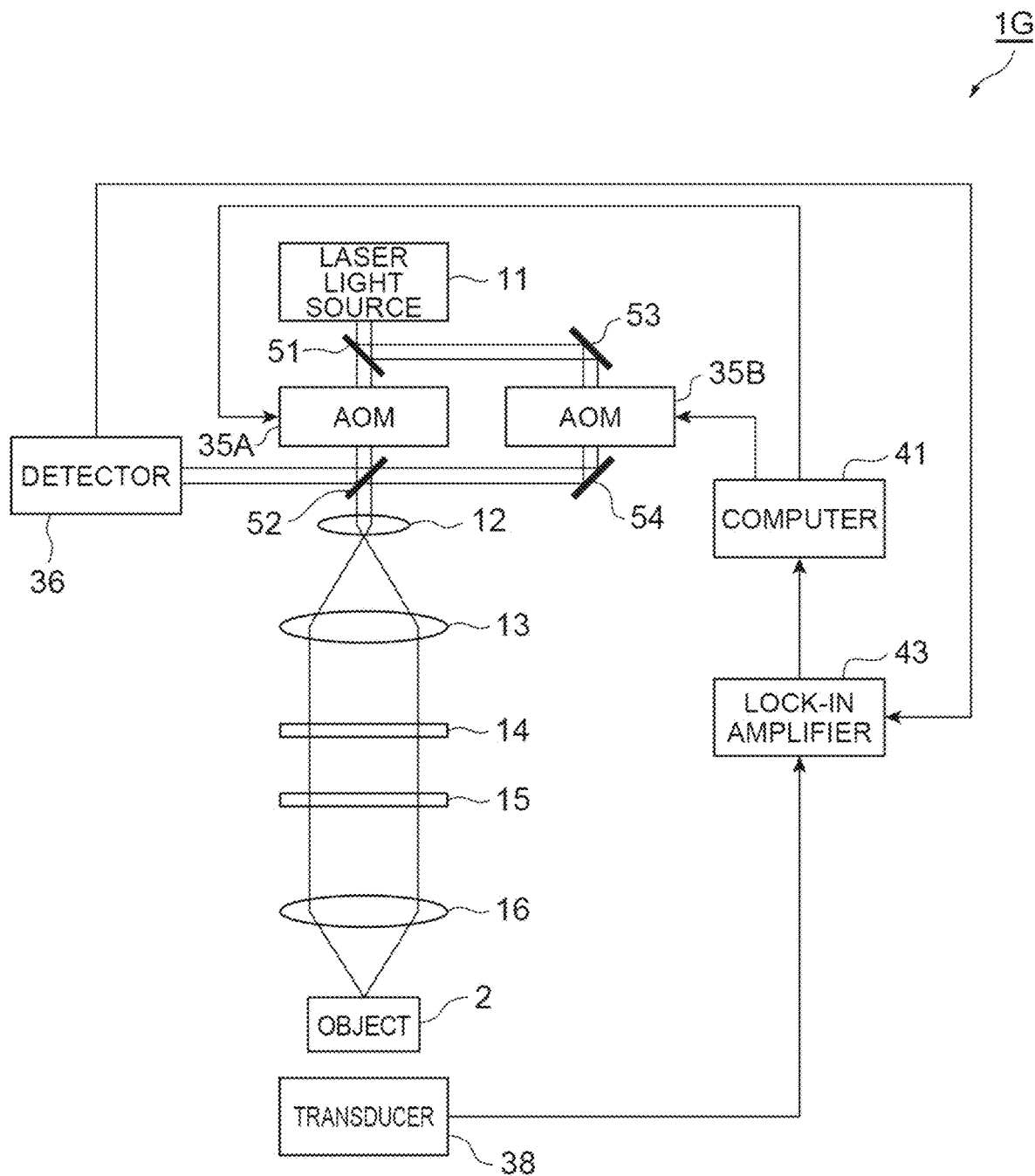
FIG. 39 is a diagram illustrating a configuration of a photoacoustic microscope 1G.

Next, an embodiment of a photoacoustic microscope will be described. FIG. 38 and FIG. 39 illustrate configuration examples of the photoacoustic microscope. Each of these photoacoustic microscopes includes the light irradiation apparatus 1 (FIG. 1) including the multi-ring mask of the present embodiment and for focusing the pulsed light on the surface or the inside of the object 2 to irradiate the object, and an acoustic wave detection apparatus for detecting an acoustic wave generated in the object 2 in response to pulsed light irradiation on the object 2 by the light irradiation apparatus 1.

FIG. 38 is a diagram illustrating a configuration of a photoacoustic microscope 1F. The photoacoustic microscope 1F includes the laser light source 11, the lens 12, the lens 13, the mask 14, the wave plate 15, and the objective lens 16. These components constitute the light irradiation apparatus (FIG. 1) for focusing and applying the pulsed light on the surface or the inside of the object 2.

The pulsed light output from the laser light source 11 is expanded in beam diameter and collimated by the lenses 12 and 13, and spatially intensity-modulated in the beam cross-section and output by the mask 14. The polarization of the pulsed light output from the mask 14 is controlled by the wave plate 15, and then the light is focused on the surface or the inside of the object 2 by the objective lens 16.

Further, the photoacoustic microscope 1F includes a transducer 38. The transducer 38 is the acoustic wave detection apparatus for detecting the acoustic wave generated in the object 2 in response to the pulsed light irradiation on the object 2. When the pulsed light is focused and applied to the surface or the inside of the object 2, a shock wave is generated at the focusing position. The transducer 38 outputs an electric pulse having a pulse height according to the magnitude of the shock wave (acoustic wave) to the computer 41. The computer 41 inputs the electric pulse signal output from the transducer 38.

In addition, as in the configuration of the optical microscope 1A (FIG. 24), the photoacoustic microscope 1F includes a stage for moving the object 2 in each of the x-direction, the y-direction, and the z-direction (or a scanning unit for scanning the pulsed light focusing position, or an actuator for moving the objective lens 16 in the z-direction). In addition, the stage is not illustrated in FIG. 38.

The computer 41 scans the focusing position of the pulsed light in the object 2 by driving the stage (or scanning unit, actuator), and inputs the electric pulse signal indicating the acoustic wave detection result by the transducer 38 when the pulsed light focusing position is set to each position in the object 2 by the scanning Thus, the computer 41 can acquire a three-dimensional image of the object 2.

The photoacoustic microscope 1F uses the multi-ring mask of the present embodiment as the mask 14, and thus, it is possible to realize a smaller PSF, and suppress the occurrence of the side lobe and the second lobe, and therefore, it is possible to acquire a three-dimensional image having higher spatial resolution. Further, the photoacoustic microscope 1F can acquire the three-dimensional image having higher spatial resolution by using the multi-ring mask having a pattern suitable for generating the shock wave through the multi-photon absorption process as the mask 14.

Further, it is preferable that the photoacoustic microscope 1F includes an adjustment unit for adjusting a pulse width of the pulsed light with which the object 2 is irradiated. The adjustment unit may be integrally provided with the laser light source 11. As the pulse width of the pulsed light is shorter, the non-linear absorption of the pulsed light is more likely to occur in the object 2, and the shock wave is generated not only by the single-photon absorption process, but the shock wave is generated also by the two-photon absorption process. Conversely, as the pulse width of the pulsed light is longer, the non-linear absorption of the pulsed light is less likely to occur in the object 2, and although the shock wave is generated by the single-photon absorption process, the shock wave is less likely to occur by the two-photon absorption process.

By using the above, it is possible to acquire a component of the shock wave mainly due to the two-photon absorption process (that is, information of a narrow region in which the two-photon absorption process can occur), based on the electric pulse signal from the transducer 38 which detects the shock wave (shock wave due to both the single-photon absorption process and the two-photon absorption process) generated when the pulse width is set short, and the electric pulse signal from the transducer 38 which detects the shock wave (shock wave due to mainly the single-photon absorption process) generated when the pulse width is set long. Thus, it is possible to acquire a three-dimensional image having high spatial resolution.

FIG. 39 is a diagram illustrating a configuration of a photoacoustic microscope 1G. As compared with the configuration of the photoacoustic microscope 1F (FIG. 38), the configuration of the photoacoustic microscope 1G (FIG. 39) is different in that the photodetector 36, the lock-in amplifier 43, the AOM 35A, the AOM 35B, the beam splitter 51, the beam splitter 52, the mirror 53, and the mirror 54 are provided. These components are similar to those in the configuration of the optical microscope 1D (FIG. 27).

The AOM 35A, the AOM 35B, the beam splitter 51, the beam splitter 52, the mirror 53, and the mirror 54 constitute a modulation unit for temporally modulating the intensity of the pulsed light irradiation on the object 2. The photodetector 36 receives the pulsed light output from the beam splitter 52, and outputs the reference signal having the same frequency as the modulation frequency ω of the pulsed light to the lock-in amplifier 43.

The lock-in amplifier 43 inputs the shock wave intensity signal indicating the temporal change of the shock wave intensity detected by the transducer 38, and further, inputs the reference signal of the modulation frequency ω output from the photodetector 36. Further, the lock-in amplifier 43 selectively detects the component of the frequency nω being n times the modulation frequency ω in the input shock wave intensity signal, and outputs it to the computer 41. n is a positive integer. When it is set to n≥2, the lock-in amplifier 43 selectively detects and outputs the n-th harmonic component of the shock wave intensity signal.

The n-th harmonic component of the frequency nω in the shock wave intensity signal is based on the shock wave generated through the n-photon absorption process of the pulsed light in the object 2. The pulsed light intensity increases as the position is closer to the center position in the pulsed light focusing region, and thus, the n-th harmonic component in the shock wave intensity signal represents the intensity of the shock wave generated near the center position in the pulsed light focusing region.

The photoacoustic microscope 1G uses the multi-ring mask of the present embodiment as the mask 14, and thus, it is possible to realize a smaller PSF, and suppress the occurrence of the side lobe and the second lobe, and therefore, it is possible to acquire a three-dimensional image having higher spatial resolution. Further, the photoacoustic microscope 1G can acquire the three-dimensional image having higher spatial resolution by obtaining the n-th harmonic component in the shock wave intensity signal.

The multi-ring mask according to the present embodiment, the light irradiation apparatus including the mask, and the microscope including the light irradiation apparatus have the following effects.

In the living body internal measurement, the immersion liquid or the object may be a factor of aberrations. For example, with respect to the immersion liquid, an aberration occurs due to a schlieren phenomenon or the like in which a refractive index becomes non-uniform due to convection of the immersion liquid caused by temperature unevenness, dissolution of contents from the object into the immersion liquid, or the like. Further, with respect to the object, an aberration occurs due to a refractive index difference between the object surface and the immersion liquid or a variation in refractive index due to the internal structure of the object. Corrections can be made for measurable aberrations. However, it is not easy to cope with an unexpected short-time aberration or the like by corrections. Further, when an assumed refractive index or observation depth in the object is different from an actual case, a slight aberration may occur. Therefore, a ring mask which is less susceptible to aberrations is desired. The single-ring mask is significantly susceptible to aberrations, and thus, observation results deteriorate due to aberrations. On the other hand, the multi-ring mask of the present embodiment can further increase the improvement rate of the PSF, and in addition, may be designed in consideration of the second lobe caused by aberrations, thereby reducing influence of aberrations and realizing good observation.

The multi-ring mask of the present embodiment can perform the observation with high resolution due to the above effects. By using the quintuple-ring mask of the present embodiment, an improvement of about 1.2 times is expected in both the horizontal direction (direction perpendicular to the optical axis) and the vertical direction (optical axis direction). This is equivalent to a 1.05 times improvement in the NA of the objective lens. In the processing also, internal processing with a small processing mark can be expected. Further, there is a physical restriction on increasing the NA of the objective lens in order to reduce the PSF, and in addition, by using the multi-ring mask of the present embodiment, the PSF can be reduced beyond the restriction.

In the multi-ring mask of the present embodiment, the number of the ring-shaped light-shielding areas may be 2 or more, and although the upper limit is not particularly specified, it is sufficient to set to about 28, and the number is preferably about 3 or more and 16 or less. When the number of the ring-shaped light-shielding areas is large, the light use efficiency decreases, which is not preferable, and further, the radial width of the transmitting area decreases, which is also not preferable in that the expression capability decreases. In addition, when the number of the ring-shaped light-shielding areas is large, it is possible to suppress an increase amount of background noise due to the influence of aberrations at the time of the living body internal observation, and it is possible to obtain a high quality image. Further, when the number of the ring-shaped light-shielding areas is large, it is possible to realize the multi-ring mask in which the resolution is not reduced to the limit of the ring shape, but the diffraction limit is exceeded and the light use efficiency is high. Thus, in the multi-ring mask of the present embodiment, the upper limit of the number of the ring-shaped light-shielding areas is about 28.

When the light irradiation apparatus includes the multiring mask of the present embodiment, the focusing region of the excitation light can be reduced, and the measurement with high resolution can be performed, or the processing with a small processing mark can be performed. In particular, the light irradiation apparatus including the multi-ring mask of the present embodiment may be suitably used in the microscopic observation or the processing using the multiphoton absorption in which the intensity ratio between the main lobe and the side lobe is large.

As a microscope having high resolution, a laser scanning type confocal microscope is known. This confocal microscope can acquire a fluorescence image using the single-photon excitation of the excitation light. The confocal microscope mainly uses the excitation light in a visible region, and thus, absorption and scattering of the excitation light in the object (living body) are large. Further, in the confocal microscope, the fluorescence may be generated from all regions irradiated with the excitation light in the object, and a pinhole is used as a local detection element for increasing resolution. In the observation of a deep portion of the object, aberrations and scattering caused by the object become large, and thus, the effect of the pinhole becomes small. For these reasons, the confocal microscope has a disadvantage of low optical resolution or the like. In addition, when observing the surface of the object, the confocal microscope is effective.

On the other hand, the microscope using the light irradiation apparatus including the multi-ring mask of the present embodiment can acquire a high resolution fluorescence image by suppressing the influence of aberrations not only on the surface of the object but also on the inside thereof. Further, when the multi-photon absorption is used, the excitation light in a near-infrared region can be used, and thus, absorption and scattering of the excitation light in the object (living body) is small. In this regard as well, the light irradiation apparatus of the present embodiment can be suitably used for the observation of the inside of the object.

The multi-ring mask, the light irradiation apparatus, and the microscope are not limited to the embodiments and configuration examples described above, and may be modified in various ways.

The multi-ring mask of the above embodiment is a multi-ring mask for spatially intensity-modulating input light in a beam cross-section and outputting modulated light, and includes a plurality of ring-shaped light-shielding areas provided around a center position; a transmitting area provided between two adjacent light-shielding areas out of the plurality of light-shielding areas; an innermost transmitting area provided inside an innermost light-shielding area out of the plurality of light-shielding areas; and an outermost transmitting area provided outside an outermost light-shielding area out of the plurality of light-shielding areas, and a radial width of each of the two adjacent light-shielding areas out of the plurality of light-shielding areas is larger than a radial width of the transmitting area provided between the two light-shielding areas.

The above multi-ring mask may include a spatial light modulator of an amplitude modulation type or a phase modulation type, and include the light-shielding areas and the transmitting areas according to a pattern presented on the spatial light modulator. The multi-ring mask may include a toroidal lens, and include the light-shielding areas and the transmitting areas according to a pattern of the toroidal lens. Further, the multi-ring mask may have a configuration in which a plurality of masks each including one or a plurality of ring-shaped light-shielding areas provided around the center position are stacked.

The light irradiation apparatus of the above embodiment includes a light source for outputting coherent light; a focusing optical system for focusing light output from the light source; and the above-described multi-ring mask provided on an optical path between the light source and a focusing position by the focusing optical system.

The optical microscope of the above embodiment includes the above-described light irradiation apparatus for focusing light on a surface or an inside of an object to irradiate the object; and a photodetection apparatus for detecting light generated in the object in response to light irradiation on the object by the light irradiation apparatus.

In the above optical microscope, the photodetection apparatus may include a pinhole plate having an aperture at a position conjugate to the focusing position by the light irradiation apparatus, and a photodetector for receiving light passing through the aperture in the light generated in the object. The light irradiation apparatus may include a modulation unit for temporally modulating an intensity of the light irradiation on the object, and the photodetection apparatus may obtain a component of a frequency being n times (n is an integer of 1 or more) a modulation frequency at the time of intensity modulation of the light irradiation by the modulation unit in the light generated in the object. Further, the light irradiation apparatus may include an adjustment unit for adjusting an intensity of the light irradiation on the object, and the photodetection apparatus may detect the light generated in the object when the intensity of the light irradiation on the object is set to each of a plurality of values by the adjustment unit, and obtain a non-linear component included in the light generated in the object based on detection results.

The photoacoustic microscope of the above embodiment includes the above-described light irradiation apparatus for focusing pulsed light on a surface or an inside of an object to irradiate the object; and an acoustic wave detection apparatus for detecting an acoustic wave generated in the object in response to pulsed light irradiation on the object by the light irradiation apparatus.

In the above photoacoustic microscope, the light irradiation apparatus may include an adjustment unit for adjusting a pulse width of the pulsed light with which the object is irradiated, and the acoustic wave detection apparatus may detect the acoustic wave generated in the object when the pulse width is set to each of a plurality of values by the adjustment unit, and obtain a component of an acoustic wave generated by a multi-photon absorption process in the acoustic wave generated in the object based on detection results. Further, the light irradiation apparatus may include a modulation unit for temporally modulating an intensity of the pulsed light irradiation on the object, and the acoustic wave detection apparatus may obtain a component of a frequency being n times (n is an integer of 1 or more) a modulation frequency at the time of intensity modulation of the pulsed light irradiation by the modulation unit in the acoustic wave generated in the object.

INDUSTRIAL APPLICABILITY

The present invention can be used as an apparatus capable of efficiently focusing light on a region smaller than a diffraction limit. Further, the present invention can be used as a microscope capable of acquiring an image with high spatial resolution.

REFERENCE SIGNS LIST

1—light irradiation apparatus, 1A-1E—optical microscope, 1F, 1G—photoacoustic microscope, 2—object, 11—laser light source, 12, 13—lens, 14—mask, 15—wave plate, 16—lens, 31—dichroic mirror, 32—lens, 33—photodetector, 34—pinhole plate, 35, 35A, 35B—acousto-optic modulator (AOM), 36—photodetector, 37—adjustment unit, 38—transducer, 41—computer, 42—stage, 43—lock-in amplifier, 51, 52—beam splitter, 53, 54—mirror.

The invention claimed is:

1. A multi-ring mask for spatially intensity-modulating input light in a beam cross-section and outputting modulated light, the multi-ring mask comprising:
a plurality of ring-shaped light-shielding areas provided around a center position; a transmitting area provided between two adjacent light-shielding areas out of the plurality of light-shielding areas; an innermost transmitting area provided inside an innermost light-shielding area out of the plurality of light-shielding areas; and an outermost transmitting area provided outside an outermost light-shielding area out of the plurality of light-shielding areas, wherein
the innermost transmitting area includes the center position of the multi-ring mask, and has a circle shape or an ellipse shape,
a radial width of each of the two adjacent light-shielding areas out of the plurality of light-shielding areas is larger than a radial width of the transmitting area provided between the two light-shielding areas, and
a pattern of the multi-ring mask is switched when an intensity distribution of the input light is changed by changing a magnification for the input light or a wavelength of the input light.

2. The multi-ring mask according to claim 1, comprising a spatial light modulator of an amplitude modulation type or a phase modulation type, and including the light-shielding areas and the transmitting areas according to a pattern presented on the spatial light modulator.

3. The multi-ring mask according to claim 1, comprising a toroidal lens, and including the light-shielding areas and the transmitting areas according to a pattern of the toroidal lens.

4. The multi-ring mask according to claim 1, having a configuration in which a plurality of masks each including one or a plurality of ring-shaped light-shielding areas provided around the center position are stacked.

5. A light irradiation apparatus comprising:
a light source configured to output coherent light;
a focusing optical system configured to focus light output from the light source; and
the multi-ring mask according to claim 1 provided on an optical path between the light source and a focusing position by the focusing optical system.

6. An optical microscope comprising:
the light irradiation apparatus according to claim 5 configured to focus light on a surface or an inside of an object to irradiate the object; and
a photodetection apparatus configured to detect light generated in the object in response to light irradiation on the object by the light irradiation apparatus.

7. The optical microscope according to claim 6, wherein the photodetection apparatus includes a pinhole plate having an aperture at a position conjugate to the focusing position by the light irradiation apparatus, and a photodetector configured to receive light passing through the aperture in the light generated in the object.

8. The optical microscope according to claim 6, wherein the light irradiation apparatus includes a modulation unit configured to temporally modulate an intensity of the light irradiation on the object, and
the photodetection apparatus is configured to obtain a component of a frequency being n times (n is an integer of 1 or more) a modulation frequency at the time of intensity modulation of the light irradiation by the modulation unit in the light generated in the object.

9. The optical microscope according to claim 6, wherein the light irradiation apparatus includes an adjustment unit configured to adjust an intensity of the light irradiation on the object, and
the photodetection apparatus is configured to detect the light generated in the object when the intensity of the light irradiation on the object is set to each of a plurality of values by the adjustment unit, and obtain a non-linear component included in the light generated in the object based on detection results.

10. A photoacoustic microscope comprising:
the light irradiation apparatus according to claim 5 configured to focus pulsed light on a surface or an inside of an object to irradiate the object; and
an acoustic wave detection apparatus configured to detect an acoustic wave generated in the object in response to pulsed light irradiation on the object by the light irradiation apparatus.

11. The photoacoustic microscope according to claim 10, wherein the light irradiation apparatus includes an adjustment unit configured to adjust a pulse width of the pulsed light with which the object is irradiated, and
the acoustic wave detection apparatus is configured to detect the acoustic wave generated in the object when the pulse width is set to each of a plurality of values by the adjustment unit, and obtain a component of an acoustic wave generated by a multi-photon absorption process in the acoustic wave generated in the object based on detection results.

12. The photoacoustic microscope according to claim 10, wherein the light irradiation apparatus includes a modulation unit configured to temporally modulate an intensity of the pulsed light irradiation on the object, and
the acoustic wave detection apparatus is configured to obtain a component of a frequency being n times (n is an integer of 1 or more) a modulation frequency at the time of intensity modulation of the pulsed light irradiation by the modulation unit in the acoustic wave generated in the object.

* * * * *